(12) United States Patent
Sousa Soares De Oliveira Braga et al.

(10) Patent No.: US 10,411,293 B2
(45) Date of Patent: Sep. 10, 2019

(54) SOLID ELECTROLYTE GLASS FOR LITHIUM OR SODIUM IONS CONDUCTION

(71) Applicants: UNIVERSIDADE DO PORTO, Oporto (PT); LABORATÓRIO NACIONAL DE ENERGIA E GEOLOGIA, Amadora (PT)

(72) Inventors: Maria Helena Sousa Soares De Oliveira Braga, Oporto (PT); José Jorge Do Amaral Ferreira, Amadora (PT)

(73) Assignees: UNIVERSIDADE DO PORTO, Oporto (PT); LABORATÓRIO NACIONAL DE ENERGIA E GEOLOGIA, Amadora (PT)

( * ) Notice: Subject to any disclaimer, the term of this patent is extended or adjusted under 35 U.S.C. 154(b) by 0 days.

(21) Appl. No.: 15/121,678

(22) PCT Filed: Feb. 26, 2015

(86) PCT No.: PCT/IB2015/051440
§ 371 (c)(1),
(2) Date: Aug. 25, 2016

(87) PCT Pub. No.: WO2015/128834
PCT Pub. Date: Sep. 3, 2015

(65) Prior Publication Data
US 2016/0365602 A1    Dec. 15, 2016

(30) Foreign Application Priority Data
Feb. 26, 2014 (PT) .................................. 107482

(51) Int. Cl.
*H01M 10/0562* (2010.01)
*H01G 11/56* (2013.01)
(Continued)

(52) U.S. Cl.
CPC .......... *H01M 10/0562* (2013.01); *H01G 9/15* (2013.01); *H01G 11/56* (2013.01);
(Continued)

(58) Field of Classification Search
None
See application file for complete search history.

(56) References Cited

U.S. PATENT DOCUMENTS

| 4,307,163 A | 12/1981 | Joshi et al. |
| 5,279,910 A | 1/1994 | Sasaki et al. |

(Continued)

FOREIGN PATENT DOCUMENTS

| CA | 2267319 A1 | 4/1998 |
| CA | 2940598 A1 | 9/2015 |

(Continued)

OTHER PUBLICATIONS

Braga et al. "The Role of Defects in Li 3 ClO Solid Electrolyte: Calculations and Experiments." MRS Online Proceedings Library Archive 1526 (2013). 5 pages.

(Continued)

*Primary Examiner* — Wyatt P McConnell
(74) *Attorney, Agent, or Firm* — Leason Ellis LLP

(57) ABSTRACT

Glassy electrolyte for lithium or sodium ions conduction The present disclosure relates to the development and improvement of sodium or lithium-ion electrochemical devices, in particular to the development of a new glassy electrolyte comprising high ionic conductivity for batteries, capacitors, and other electrochemical devices comprising a solid electrolyte glass comprising the formula $R_{3-2x}M_x\text{HalO}$ wherein R is selected from the group consisting of lithium or sodium; M is selected from the group consisting of magnesium, calcium, strontium or barium; Hal is selected from the group consisting of fluorine, chlorine, bromine, iodine or mixtures thereof; X is the number of moles of M and $0 \leq x \leq 0.01$ and the solid electrolyte glass has a glass transition point.

19 Claims, 10 Drawing Sheets

(51) Int. Cl.
  *H01M 10/052* (2010.01)
  *H01M 10/054* (2010.01)
  *H01M 16/00* (2006.01)
  *H01G 11/84* (2013.01)
  *H01G 9/15* (2006.01)
  *H01M 10/0525* (2010.01)

(52) U.S. Cl.
  CPC .......... *H01G 11/84* (2013.01); *H01M 10/052* (2013.01); *H01M 10/054* (2013.01); *H01M 10/0525* (2013.01); *H01M 16/00* (2013.01); *H01M 2300/0071* (2013.01); *Y02E 60/13* (2013.01)

(56) References Cited

U.S. PATENT DOCUMENTS

| | | | |
|---|---|---|---|
| 5,547,782 | A | 8/1996 | Dasgupta et al. |
| 5,631,532 | A | 5/1997 | Azuma et al. |
| 2004/0106046 | A1 | 6/2004 | Inda |
| 2006/0263649 | A1 | 11/2006 | Sohn |
| 2007/0003833 | A1 | 1/2007 | Li et al. |
| 2007/0148553 | A1 | 6/2007 | Weppner |
| 2012/0295147 | A1 | 11/2012 | Liu et al. |
| 2013/0202971 | A1 | 8/2013 | Zhao et al. |
| 2013/0344363 | A1* | 12/2013 | Upadhyaya ............ H01M 2/105 429/94 |
| 2014/0113187 | A1 | 4/2014 | Winoto et al. |
| 2014/0141318 | A1 | 5/2014 | Lee et al. |
| 2014/0272564 | A1 | 9/2014 | Holme et al. |
| 2015/0303456 | A1 | 10/2015 | Yoo et al. |
| 2015/0364788 | A1 | 12/2015 | Lu et al. |
| 2016/0190640 | A1 | 6/2016 | Visco et al. |
| 2016/0365602 | A1 | 12/2016 | Sousa Soares De Oliveira Braga et al. |
| 2016/0368777 | A1 | 12/2016 | Goodenough et al. |
| 2018/0013170 | A1 | 1/2018 | Goodenough et al. |
| 2018/0097257 | A1 | 4/2018 | Sousa Soares De Oliveira Braga et al. |

FOREIGN PATENT DOCUMENTS

| | | |
|---|---|---|
| CN | 101811828 A | 8/2010 |
| CN | 102249350 A | 11/2011 |
| CN | 103268930 A | 9/2015 |
| DE | 10 2005 03851 A1 | 2/2007 |
| EP | 3111503 A1 | 1/2017 |
| KR | 20160142293 A | 12/2016 |
| WO | 2012112229 A1 | 2/2007 |
| WO | WO2012/112229 * | 8/2012 |
| WO | 2013077863 A1 | 5/2013 |
| WO | 2015128834 A1 | 9/2015 |
| WO | 2016026130 A1 | 2/2016 |
| WO | 2016142927 A1 | 9/2016 |
| WO | 2016157083 A1 | 10/2016 |
| WO | 2016205064 A1 | 12/2016 |
| WO | 2018013471 A1 | 1/2018 |

OTHER PUBLICATIONS

Chen et al. "Multi-scale study of thermal stability of lithiated graphite." Energy & Environmental Science 4.10 (2011): 4023-4030.
Choi et al. "Challenges facing lithium batteries and electrical double-layer capacitors." Angewandte Chemie International Edition 51.40 (2012): 9994-10024.
Emly et al. "Phase stability and transport mechanisms in antiperovskite Li3OCl and Li3OBr superionic conductors" Chemistry of Materials 25.23 (2013): 4663-4670.
Hayashi et al. "Characterization of Li2S—SiS2—LixMOy (M=Si, P, Ge) amorphous solid electrolytes prepared by melt-quenching and mechanical milling." Solid State Ionics 148.3-4 (2002): 381-389.
Kamaya et al. "A lithium superionic conductor." Nature Materials 10.9 (2011): 682-686.
Kondo et al. "New lithium ion conductors based on Li2S—SiS2 system." Solid State Ionics 53 (1992): 1183-1186.
Mo et al. "First principles study of the Li10GeP2S12 lithium super ionic conductor material." Chemistry of Materials 24.1 (2011): 15-17.
Schroeder et al. "Stability of the solid electrolyte Li3OBr to common battery solvents." Materials Research Bulletin 49 (2014): 614-617.
Tatsumisago et al. "Superionic glasses and glass—ceramics in the Li2S—P2S5 system for all-solid-state lithium secondary batteries." Solid State Ionics 225 (2012): 342-345.
Zhao et al. "Superionic conductivity in lithium-rich anti-perovskites." Journal of the American Chemical Society 134.36 (2012): 15042-15047.
No Author. "NRL's Sodium Sulfur Battery Experiment Flies Aboard STS-87." NRL's Sodium Sulfur Battery Experiment Flies Aboard STS-87—U.S. Naval Research Laboratory. 1997. www.nrl.navy.mil/media/news-releases/1997/nrls-sodium-sulfur-battery-experiment-flies-aboard-sts87. 1 page.
Alcantara, R., Lavela, P., Ortiz, G. F., Tirado, J. L, Carbon Microspheres Obtained from Resorcinol-Formaldehyde as High-Capacity Electrodes for Sodium-Ion Batteries. Electrochem. Solid-Stote Lett, 8, A222 (2005); 4 pages.
Angell, C. Austin, et al. "Relaxation in glassforming liquids and amorphous solids." Journal of Applied Physics 88.6 (2000): 3113-3157; 45 pages.
Angell, C. Austin. "Dynamic processes in ionic glasses." Chemical Reviews 90.3 (1990): 523-542; 20 pages.
Auxer, W. The PB sodium sulfur cell for satellite battery applications. Proceedings of the International Power Sources Symposium, 32nd, Cherry Hill, NJ (Pennington, NJ: Electrochemical Society). A88-16601 04-44:49-54. (1986); 7 pages.
BeauHD, "The Slashdot Interview with Lithium-Ion Battery Inventor John B. Goodenough." Posted Apr. 19, 2017, retrieved from <https://hardware.slashdot.org/story/17/04/19/016213/the-slashdot-interview-with-lithium-ion-battery-inventor-john-b-goodenough>; 36 pages.
Blöchl, Peter E. "Projector augmented-wave method." Physical review B 50.24 (1994): 17953; 27 pages.
Braga, M. H., et al. "Alternative strategy for a safe rechargeable battery." Energy & Environmental Science 10.1 (2017): 331-336; 6 pages.
Braga, M. H., et al. "Novel Li 3 ClO based glasses with superionic properties for lithium batteries." Journal of Materials Chemistry A 2.15 (2014): 5470-5480; 11 pages.
Braga, M. Helena, et al. "Electric Dipoles and Ionic Conductivity in a Na+ Glass Electrolyte." Journal of the dectrochemical Society 164.2 (2017): A207-A213; 7 pages.
Braga, M. Helena, et al. "Glass-amorphous alkali-ion solid electrolytes and their performance in symmetrical cells." Energy & Environmental Science 9.3 (2016): 948-954; 7 pages.
Braga, Maria Helena, et al. "Nontraditional, Safe, High Voltage Rechargeable Cells of Long Cycle Life." Journal of the American Chemical Society 140.20 (2018): 6343-6352; 20 pages.
Bruce, P. G., "Electrochemical Publishing" Solid State Electrochemistry, Cambridge University Press, 1994; 1 page.
Christensen, M., et al. "H in αZr and in zirconium hydrides: solubility, effect on dimensional changes, and the role of defects." Journal of Physics: Condensed Matter 27.2 (2014): 025402; 13 pages.
Conway, B.E., Transition from "supercapacitor" to "battery" behavior in electrochemical energy storage. J. Electrochem. Soc. 138, 1539 (1991); 10 pages.
Cunningham, Tesla Model S: The battery pack, Road Show by CNET, Oct. 6, 2010; 4 pages.
Daemen L.L., "Novel anti-perovskite electrolytes for superionic lithium transport" [online], FU11 Annual Progress Report—laboratory directed research and development, Los Alamos National Library, Mar. 2012; 4 pages.

(56) References Cited

OTHER PUBLICATIONS

Doeff, Marca M., et al. "Electrochemical insertion of sodium into carbon." Journal of the Electrochemical Society 140.12 (1993): L169-L170; 2 pages.
Ellis, B. L., Nazar, L. F., Sodium and sodium-ion energy storage batteries. Curr. Opin. Solid State Mater. Sci. 16, 168 (2012); 10 pages.
Ghidiu, Michael, et al. "Conductive two-dimensional titanium carbide 'clay' with high volumetric capacitance." Nature 516.7529 (2014): 78; 13 pages.
Goodenough, John B. "Changing Outlook for Rechargeable Batteries." (2017): 1132-1135; 4 pages.
Goodenough, John B. et al. "Review-Solid Electrolytes in Rechargable Electrochemical Cells." Journal of the Electrochemical Society (2015); 6 pages.
Goodenough, John B. et al. "Solid Electrolytes in Rechargable Electrochemical Cells." Journal of the Electrochemical Society (2015); 22 pages.
Goodenough, John B., and Kyu-Sung Park. "The Li-ion rechargeable battery: a perspective." Journal of the American Chemical Society 135.4 (2013): 1167-1176; 10 pages.
Goodenough, John B., and M. Helena Braga. "Batteries for electric road vehicles." Dalton Transactions 47.3 (2017): 645-648; 4 pages.
H. Mehrer, Diffusion in Solids Fundamentals, Methods, Materials, Diffusion-Controlled Processes, Springer Series in Solid-State Sciences, 1st edn, vol. 155, 2007; 645 pages.
Hartwig, P., A. Rabenau, and W. Weppner. "Lithium hydroxide halides: phase equilibria and ionic conductivities." Journal of the Less Common Metals 78.2 (1981): 227-233; 7 pages.
Hartwig, P., and W. Weppner. "Ionic conductivities of lithium-halide-based quaternary compounds." Solid State Ionics 3 (1981): 249-254; 6 pages.
Hayashi, Akitoshi, et al. "Rechargeable lithium batteries, using sulfur-based cathode materials and Li2S—P2S5 glass-ceramic electrolytes." Electrochimica Acta 50.2-3 (2004): 893-897; 5 pages.
Hebb, Malcolm H. "Electrical conductivity of silver sulfide." The journal of chemical physics 20.1 (1952): 185-190; 6 pages.
Heimann, B., Classic and Advanced Ceramics: From Fundamentals to Applications. John Wiley & Sons, Apr 16, 2010; 576 pages.
Heyd, Jochen, Gustavo E. Scuseria, and Matthias Ernzerhof. "Hybrid functionals based on a screened Coulomb potential." The Journal of Chemical Physics 118.18 (2003): 8207-8215; 9 pages.
Hong, S. Y., Kim, Y., Pa rk, Y., Choi, A., Choic, N.-S., Lee, K. T., Charge carriers in rechargeable batteries: Na ions vs. Li ions, Energy Environ. Sci. 6, 2067 (2013); 15 pages.
Hönnerscheid, Andreas, et al. "Die Kristallstrukturen der Hydroxyhalogenide Li4(OH)3Br und Li4(OH)3I." Zeitschrift für anorganische und allgemeine Chemie 629.2 (2003): 317-320; 4 pages.
Hsu, Jeremy. "Texas Town Installs a Monster Battery for Backup Power." Popular Science, Apr. 5, 2010, www.popsci.com/technology/article/2010-04/texas-town-turns-monster-battery-backup-power.
Inaguma, Yoshiyuki, et al. "High ionic conductivity in lithium lanthanum titanate." Solid State Communications 86.10 (1993): 689-693; 5 pages.
International Preliminary Report on Patentability for PCT Patent Application No. PCT/IB2016/051451, mailed Sep. 21, 2017; 7 pages.
International Preliminary Report on Patentability for PCT Patent Application No. PCT/IB2016/051776, dated Oct. 3, 2017; 8 pages.
International Preliminary Report on Patentability for PCT Patent Application No. PCT/US2016/036661, dated Dec. 28, 2017; 13 pages.
International Search Report and Written Opinion received for PCT Patent Application No. PCT/US2016/036661, dated Nov. 30, 2016; 20 pages.
International Search Report and Written Opinion received for PCT Patent Application No. PCT/US2017/041348, dated Aug. 17, 2017; 15 pages.
International Search Report and Written Opinion received for PCT Patent Application No. PCT/US2017/041382, dated Aug. 25, 2017; 12 pages.
ISO 11357-2: Plastics— Differential Scanning Calorimetry (DSC)— Part 2: Determination of glass transition temperature, 1999; 12 pages.
Hansen et al. "Dynamics of Supercooled Liquids." Theory of Simple Liquids, Elsevier, 2006, 250-254; 10 pages.
Jayaprakash, N., Shen, J., Moganty, S. S., Corona, A., Archer, L. A. Porous Hollow Carbon@Sulfur Composites for High-Power Lithium-Sulfur Batteries. Angew. Chem. Int. Ed. 50, 5904 (2011); 5 pages.
Jennings, James Robert, Qizhao Huang, and Qing Wang. "Kinetics of Li x FePO4 Lithiation/Delithiation by Ferrocene-Based Redox Mediators: An Electrochemical Approach." The Journal of Physical Chemistry C 119.31 (2015): 17522-17528; 7 pages.
Ji, L. et al. Graphene Oxide as a Sulfur Immobilizer in High Performance Lithium/Sulfur Cells, JACS, 133, 18522 (2011); 4 pages.
Jung, H. Y., Karimi, M. B., Hahm, M. G., Ajayan, P. M., Jung, Y. J., Transparent, flexible supercapacitors from nano-engineered carbon films. Sci. Rep. 2, 773 (2012); 5 pages.
Koenig, A. A., Rasmussen, J. R. Development of a high specific power sodium sulfur cell. Proceedings of the 34th International Power Sources Symposium, p. 30. doi:10.1109/IPSS.1990.145783, 1990; 4 pages.
Kresse, Georg, and Jüurgen Furthmüller. "Efficient iterative schemes for ab initio total-energy calculations using a plane-wave basis set." Physical review B 54.16 (1996): 11169; 18 pages.
Lapp, Torben, Steen Skaarup, and Alan Hooper. "Ionic conductivity of pure and doped Li3N." Solid State Ionics 11.2 (1983): 97-103; 7 pages.
Li, H. B. et al. Amorphous nickel hydroxide nanospheres with ultrahigh capacitance and energy density as electrochemical pseudocapacitor materials. Nature Commun. 4, 1894 (2013); 8 pages.
Liu, D., et al. "Spinel materials for high-voltage cathodes in Li-ion batteries." Rsc Advances 4.1 (2014): 154-167; 14 pages.
Liu, Duay, J., Lane, T., Lee, S. B. Synthesis and characterization of Ru02/poly(3,4-ethylenedioxythiophene) composite nanotubes for supercapacitors. Phys. Chem. Chem. Phys. 12, 4309 (2010); 8 pages.
Liu, Zengcai, et al. "Anomalous high ionic conductivity of nanoporous β-Li3PS4." Journal of the American Chemical Society 135.3 (2013): 975-978; 4 pages.
Lu, S., Chen, Y., Wu, X., Wang, Z., Yang Li, Y. Three-Dimensional Sulfur/Graphene Multifunctional Hybrid Sponges for Lithium— Sulfur Batteries with Large Areal Mass Loading. Sci. Rep. 4, 4629 (2014); 4 pages.
Ma, G., A lithium anode protection guided highly-stable lithium— sulfur battery. Chem. Commun. 50, 14209 (2014); 4 pages.
Manthiram, Arumugam, et al. "Rechargeable lithium—sulfur batteries." Chemical reviews 114.23 (2014): 11751-11787; 37 pages.
Nagao, M., Hayashi, A., Tatsumisago, M. Fabrication of favorable interface between sulfide solid electrolyte and Li metal electrode for bulk-type solid-state Li/S battery, Electrochem. Commun. 22, 177 (2012); 4 pages.
Ohara Inc., "<1)LICGC™AG-01." Ohara Inc. : Lithium-Ion Conducting Glass-Ceramics (LICGC) :Development Products, www.ohara-inc.co.jp/en/product/electronics/licgc.html; 2 pages.
Ong, S. P., Chevrier, V. L, Hautier, G., Jain, A., Moore, C, Kim, S., Ma, X. H., Ceder, G., "Voltage, Stability and Diffusion Barrier Differences Between Sodium-ion and Lithium-ion Intercalation Materials". Energy Environ. Sci., 4, 3680 (2011); 9 pages.
Palomares, Verónica, et al. "Na-ion batteries, recent advances and present challenges to become low cost energy storage systems." Energy & Environmental Science 5.3 (2012): 5884-5901; 18 pages.
Parlinski, K., Z. Q. Li, and Y. Kawazoe. "First-principles determination of the soft mode in cubic ZrO 2." Physical Review Letters 78.21 (1997): 4063; 4 pages.
Perdew, John P., and Yue Wang. "Accurate and simple analytic representation of the electron-gas correlation energy." Physical Review B 45.23 (1992): 13244; 6 pages.

(56) References Cited

OTHER PUBLICATIONS

Sakka, S., and J. D. and Mackenzie. "Relation between apparent glass transition temperature and liquids temperature for inorganic glasses." Journal of Non-Crystalline Solids 6.2 (1971): 145-162; 12 pages.

Schwering, Georg, et al. "High Lithium Ionic Conductivity in the Lithium Halide Hydrates $Li_{3-n}$ (OHn) Cl ($0.83 \leq n \leq 2$) and $Li_{3-n}$ (OHn) Br ($1 \leq n \leq 2$) at Ambient Temperatures." ChemPhysChem 4.4 (2003): 343-348; 6 pages.

Shannon, Robert D. "Revised effective ionic radii and systematic studies of interatomic distances in halides and chalcogenides." Acta crystallographica section A: crystal physics, diffraction, theoretical and general crystallography 32.5 (1976): 751-767; 17 pages.

Song, H. K., Lee, K. T., Kim, M. G., Nazar, L. F., Cho, J., Recent progress in nanostructured cathode materials for lithium secondary batteries. Adv. Fund. Mater. 20, 3818 (2010); 17 pages.

Song, J. Y., Y. Y. Wang, and C. C. Wan. "Conductivity study of porous plasticized polymer electrolytes based on poly (vinylidene fluoride) a comparison with polypropylene separators." Journal of the Electrochemical Society 147.9 (2000): 3219-3225; 7 pages.

Song, W., Cao, X., Wu, Z., Chen, J., Huangfu, K., Wang, X., Huang, Y., Ji, X. A study into the extracted ion number for NASICON structured $Na_3V_2(PO_4)_3$ in sodium-ion batteries Phys. Chem. Chem. Phys. 16, 17681 (2014); 7 pages.

Stahlkopf, Karl (Jun. 2006). Taking Wind Mainstream. IEEE Spectrum, retrieved Mar. 21, 2015; 4 pages.

Stevens, D. A., Dahn J. R. High capacity anode materials for rechargeable sodium-ion batteries. J. Electrochem. Soc. 147, 1271 (2000); 3 pages.

Takada, Kazunori, Noboru Aotani, and Shigeo Kondo. "Electrochemical behaviors of Li+ ion conductor, $Li_3PO_4$-$Li_2S$-$SiS_2$." Journal of power sources 43.1 (1993): 135-141; 7 pages.

Tarascon, J.-M., Armand, M., Issues and challenges facing rechargeable lithium batteries. Nature 414, 359 (2001); 9 pages.

Vlad, A. et al. Hybrid supercapacitor-battery materials for fast electrochemical charge storage. Sci. Rep. 4, 4315 (2014); 7 pages.

Walawalkar, R., Apt, J., Mancini, R. (2007). Economics of electric energy storage for energy arbitrage and regulation in New York. Energy Policy 35(4), 2558 (2007); 11 pages.

Wang, Yonggang, et al. "Structural manipulation approaches towards enhanced sodium ionic conductivity in Na—rich antiperovskites." Journal of Power Sources 293, Jun. 10, 2015 (Jun. 10, 2015), pp. 735-740, XP055279752, CH ISSN: 0378-7753, DOI: 10.1016/j.powsour.2015.06.002 abstract; 6 pages.

Wimmer, Erich, et al. "Temperature-dependent diffusion coefficients from ab initio computations: Hydrogen, deuterium, and tritium in nickel." Physical Review B 77.13 (2008): 134305; 12 pages.

Xie, J. et al. Preparation of three-dimensional hybrid nanostructure-encapsulated sulfur cathode for high-rate lithium sulfur batteries. J. Power Sources, 253, 55 (2014); 9 pages.

Yabuuchi, N., Kubota, K., Dahbi, M., Komaba, S., Research Development on Sodium-Ion Batteries. Chem. Rev. 114, 11636 (2014); 47 pages.

Yao, H. et al. Improved lithium-sulfur batteries with a conductive coating on the separator to prevent the accumulation of inactive S-related species at the cathode—separator interface. Energy Environ. Sci. 7, 3381 (2014); 10 pages.

Zhang, Jianzhong, et al. "High pressure—high temperature synthesis of lithium-rich $Li_3O$ (Cl, Br) and $Li_{3-x}Ca_{x/2}OCl$ anti-perovskite halides." Inorganic Chemistry Communications 48 (2014): 140-143.

Zhang, S. et al. Control of graphitization degree and defects of carbon blacks through ball-milling. RSC Adv. 4, 505 (2014); 5 pages.

Zhang, S. S. Liquid electrolyte lithium/sulfur battery: Fundamental chemistry, problems, and solutions. Power Sources, 231, 153 (2013); 10 pages.

Zhang, Yi, Yusheng Zhao, and Changfeng Chen. "Ab initio study of the stabilities of and mechanism of superionic transport in lithium-rich antiperovskites." Physical Review B 87.13 (2013): 134303; 8 pages.

Zheng, S. et al. J. High Performance C/S Composite Cathodes with Conventional Carbonate—Based Electrolytes in Li—S Battery. Sci. Rep. 4, 4842 (2014); 7 pages.

International Search Report and Written Opinion received for PCT Patent Application No. PCT/US2018/055342, dated Jan. 18, 2019; 14 pages.

\* cited by examiner

SOLID ELECTROLYTE GLASS FOR LITHIUM OR SODIUM IONS CONDUCTION

CROSS-REFERENCE TO RELATED APPLICATIONS

This application is a U.S. National Stage Application under 35 U.S.C. § 371 of International Patent Application No. PCT/IB2015/051440, filed Feb. 26, 2015 which claims priority to Portugal Application No. 107482, filed Feb. 26, 2014, which are hereby incorporated by reference in their respective entireties.

TECHNICAL FIELD

The present disclosure relates to the development and improvement of sodium or lithium-ion electrochemical devices, in particular to the development of a new solid electrolyte glass comprising a high ionic conductivity and/or a high electrochemical window of stability.

BACKGROUND

Four types of next generation batteries are currently being envisaged among the international community: lithium-sulfur, metal-air, and metal-sodium batteries, multivalent cation batteries and all-solid-state battery concepts (M. Tatsumisago and Hayashi, A. Sol. Stat. Ionics, 2012, 225, 342). These battery designs require high-performance, safe and cost effective electrolytes that are compatible with optimized electrode materials. Solid electrolytes have not yet been extensively employed in commercial batteries as they suffer poor ionic conduction at acceptable temperatures and insufficient stability with respect to lithium-metal.

Chen and co-workers (Z. Chen, Y. Qini, Y. Ren, W. Lu, C. Orendorff, E. P. Roth and K. Amine, *Energy Environ. Sci.* 2011, 4, 4023) showed that higher graphite negative electrode surface area in a lithium-ion cell can result in more solid electrolyte interphase (SEI) and therefore more heat generation during thermal decomposition. This initial reaction, which occurs at ~110° C., can further trigger other exothermal reactions in the cell. Therefore, the latest work on graphitic anodes mainly focuses on the development of a stable artificial solid electrolyte interphase to stabilize the lithiated graphite and improve both safety and cycling performance.

Recently, lithium batteries using oxygen from air at the positive electrode (lithium-air batteries) have attracted world-wide attention. In this open system, the use of electrolytes with low volatility is strictly required. For the lithium-air batteries a major focus of attention has been the lithium-metal anode protected by a lithium-ion conducting ceramic electrolyte (N.-S. Choi, Z. Chen, S. A. Freunberger, X. Ji, Y.-K. Sun, K. Amine, G. Yushin, L. F. Nazar, J. Cho and P. G. Bruce, *Angew. Chem. Int.* 2012, 51, 9994). LISICON ($Li_{(1+x+y)}Al_xTi_{2-x}Si_yP_{(3-y)}O_{12}$) (Ohara Inc. 2013) has been used for the previous purpose with a major inconvenient related to—LISICON being reduced in contact with Li-metal—following-on a Li/ceramic interface difficult to cycle (N.-S. Choi, Z. Chen, S. A. Freunberger, X. Ji, Y.-K. Sun, K. Amine, G. Yushin, L. F. Nazar, J. Cho and P. G. Bruce, *Angew. Chem. Int.* 2012, 51, 9994).

Promising results were recently obtained with a $Li_{10}GeP_2S_{12}$ solid electrolyte N. Kamaya, K. Homma, Y. Yamakawa, M. Hirayama, R. Kanno, M. Yonemura, T. Kamiyama, Y. Kato, S. Hama, K. Kawamoto and A. A. Mitsui, *Nature Mat.* 2011, 10, 682). In this solid electrolyte medium, $Li^+$ ions are conducted at 0.012 $mScm^{-1}$ and 12 $mScm^{-1}$ at −100° C. and 25° C., respectively, which is considered to be a high conductivity. Mo et al (Y. Mo, S. P. Ong and G. Ceder, *Chem. Mater.* 2012, 24, 15) found that $Li_{10}GeP_2S_{12}$ is not stable against reduction by lithium at low voltage or extraction of Li with decomposition at high voltage.

On a different front, sulfide glasses have been studied due to their high ionic conductivity. A glass of the $Li_3PO_4$—$Li_2S$—$SiS_2$ system is formed at ambient pressure by quenching $0.03Li_3PO_4$-$0.59Li_2S$-$0.385Si_2$ in liquid nitrogen. Its conductivity at room temperature is 0.69 $mScm^{-1}$ (S. Kondo, K. Takada and Y. Yamamura, *Sol. Stat. Ionics* 1992, 53-56(2), 1183) and its stability against electrochemical reduction is as wide as 10 V (A. Hayashi, H. Yamashita, M. Tatsumisago and T. Minami, *Sol. Stat. Ionics* 2002, 148, 381).

On the other hand, for lithium-ion or sodium-ion electrochemical devices such as capacitors and especially batteries, the safety issue remains a major barrier. Battery manufacturers are now able to produce high-quality lithium-ion cells for consumer electronics, with less than one reported safety incident for every one million cells produced. However, this failure rate is still too high for applications in plug-in hybrid electric vehicles and pure electric vehicles, since several hundred of lithium-ion cells will be needed to power a vehicle. The failure of a single cell can generate a large amount of heat and flame, both of which can then trigger thermal runaway of neighbouring cells, leading to failure throughout the battery pack. Consequently, there is a wide effort to tackle the safety issue of lithium batteries.

Typically, the conductivity of liquid state of the art electrolytes at room temperature (20° C.) is about 10 $mScm^{-1}$, and it increases by approximately 30-40% at 40° C. The electrochemical window of stability of liquid electrolytes is usually equal or smaller than 4 V, not enabling their use with all the pairs of electrodes.

The stability of the electrolyte is related to its electrochemical window which is directly related with the electrical band gap. The calculated electronic energy band gap for $Li_3ClO$ crystalline solid is 6.44 eV and does not change more than the decimal value of an eV with low dopant levels up to 0.7 at %. Cyclic voltammetry experiments conducted to determine the window of stability of the glassy samples at 130° C. have shown a stability range of more than 8 V, which allows the application of our electrolyte in next generation high voltage battery cells (5 V).

These facts are disclosed in order to illustrate the technical problem addressed by the present disclosure.

General Description

The present disclosure relies on a novel type of glasses, which is a disordered amorphous phase presenting a glass transition and showing the highest ionic conductivity of at least 13 $mScm^{-1}$ at 25° C. for Li-ion and at least 17 $mScm^{-1}$ for Na-ion at 25° C. These glassy electrolytes for lithium/sodium batteries are inexpensive, light, recyclable, non-flammable and non-toxic. Moreover, they present a wide electrochemical window (higher than 8 V) and thermal stability within the application range of temperatures.

A lithium-ion or sodium-ion battery is a rechargeable type of battery, wherein lithium/sodium ions move, through the electrolyte, from the negative electrode to the positive electrode during the discharge process and back during the charging process. The battery's electrochemistry is governed by an overall reaction occurring at the positive and negative electrodes and the battery's maximum open circuit potential difference is determined by the cited reaction.

A lithium-ion or sodium-ion electrical double layer capacitor (EDLC) is a supercapacitor, wherein lithium/sodium ions move, through the electrolyte towards the negative electrode accumulating at the interface and forming a nanometric spaced capacitor with the electrode's negative ions or electrons during charge. At the opposite interface, electrode's positive ions form another EDLC with the negative ions of the electrolyte (which are negative due to lack of Li or Na cations). The capacitor's operating potential difference is determined by the electrolyte's electrochemical window of stability.

The lithium-ion or sodium-ion batteries and capacitors are lightweight, high energy density power sources for a variety of devices, such as portable devices, power tools, electric vehicles, and electrical grid storage; contain no toxic metals and are therefore characterized as non-hazardous waste.

The disclosed subject-matter relates to a glassy electrolyte for Li-ion or Na-ion ($Li^+$ and $Na^+$, respectively). The glass is synthesized from a compound with stoichiometry $R_{3-2x}M_xHalO$, wherein R is lithium (Li) or sodium (Na); M is magnesium (Mg), calcium (Ca), strontium (Sr), or barium (Ba); Hal is fluorine (F), chlorine (Cl), bromine (Br) or iodine (I), or a mixture between these elements; O is oxygen. Furthermore, $0 \leq x \leq 0.01$, preferably with $0.002 \leq x \leq 0.007$; preferably with $0.003 \leq x \leq 0.005$.

The glassy electrolyte, after reaching the vitreous state, is a $Li^+$ ion or $Na^+$ ion superconductor in addition to being an electrical insulator demonstrating the essential functional characteristics of an electrolyte. The ionic conductivity in the disclose glassy electrolyte, comprising $Li^+$ ion or $Na^+$ ion, improves at least two orders of magnitude comparing with the crystalline material. The electrochemical window becomes also wider from 6 V to more than 8 V. It can, therefore, be applied between the negative and positive electrodes of a lithium battery or capacitor if R in the formula of the compound mentioned above is lithium, or to a sodium battery or capacitor if R in the same formula is sodium.

This glass has proved to be anti-flammable, to have lightweight, being recyclable, easy to synthesize and of low cost.

An embodiment of the disclosed subject-matter is relate to solid electrolyte glass comprising formula $R_{3-2x}M_xHalO$ wherein
  R is selected from the group consisting of lithium or sodium;
  M is selected from the group consisting of magnesium, calcium, strontium or barium;
  Hal is selected from the group consisting of fluorine, chlorine, bromine, iodine or mixtures thereof;
  X is the number of moles of M and $0 \leq x \leq 0.01$;
  and the solid electrolyte glass has a glass transition point.

In an embodiment the solid electrolyte glass does not have a peak with a half-value width of 0.64° or less in a range of $31° \leq 2\theta \leq 34°$ in measurement by an X-ray diffraction method using a CuKα ray.

In an embodiment the $Li_{3-2x0.005}Ba_{0.005}ClO$ glassy electrolyte does not have a peak with a half-value width of 0.64° or less in a range of $31° \leq 2\theta \leq 34°$ in measurement by an X-ray diffraction method using a CuKα ray.

In an embodiment the solid electrolyte glass of the present disclosure has a ionic conductivity of at least 13 mScm$^{-1}$ at 25° C. wherein R is a ion lithium; preferably an ionic conductivity of 13-60 mScm$^{-1}$ at 25° C., more preferably an ionic conductivity of at least 25 mScm$^{-1}$ at 25° C.

In an embodiment the solid electrolyte glass of the present disclosure has a ionic conductivity of at least 17 mScm$^{-1}$ at 25° C. wherein R is a ion sodium; preferably an ionic conductivity of 17-105 mScm$^{-1}$ at 25° C., more preferably an ionic conductivity of at least 31 mScm$^{-1}$ at 25° C.

The ionic conductivity can be measured by standard methods, namely by Electrochemical Impedance Spectroscopy (EIS) at 25° C.

In an embodiment the solid electrolyte glass of the present disclosure X in the formula may be 0.002, 0.005, 0.007 or 0.01.

In an embodiment the solid electrolyte glass of the present disclosure Hal may be a mixture of chloride and iodine.

In an embodiment the solid electrolyte glass of the present disclosure Hal may be Hal=0.5Cl+0.5I.

In an embodiment the solid electrolyte glass of the present disclosure wherein R is lithium:
  M is barium, Hal is chlorine and x is 0.005 or;
  M is barium, Hal is a mixture of chlorine and iodine, x is 0.005.

In an embodiment the solid electrolyte glass of the present disclosure wherein R is sodium, M is Ba, Hal is Cl and x is 0.005.

Another aspect of the present disclosure is related to a electrolyte composition, in particular a solid electrolyte glass composition, of the formula $Na_{3-2x}M_xHalO$ wherein
  M is selected from the group consisting of magnesium, calcium, strontium or barium;
  Hal is selected from the group consisting of fluorine, chlorine, bromine, iodine or mixtures thereof;
  X is the number of moles of M and $0<x \leq 0.01$.

Another aspect of the present disclosure is related to an electrochemical device comprising a glassy electrolyte describes in the present disclosure.

Another aspect of the present disclosure is related to a battery comprising a glassy electrolyte describes in the present disclosure.

Another aspect of the present disclosure is related to a capacitor comprising the glassy electrolyte describes in the present disclosure.

Another aspect of the present disclosure is related to an electrochemical device comprising at least one capacitor of the present describes in the present disclosure and at least one battery describes in the present disclosure.

Another aspect of the present disclosure is related to a method for synthetizing a conductive glass electrolyte, in particular for preparing 5 g, comprising a compound of the formula $R_{3-2x}M_xHalO$ wherein
  R is lithium;
  M is selected from the group consisting of magnesium, calcium, strontium or barium;
  Hal is selected from the group consisting of fluorine, chlorine, bromine, iodine or mixtures thereof, in particular Cl;
  X is the number of moles of M and $0 \leq x \leq 0.01$;
  comprising the following steps:
  mixing a stoichiometric quantity of LiHal, LiOH, and one of the following compounds: $Mg(OH)_2$; $Ca(OH)_2$, $Sr(OH)_2$ or $Ba(OH)_2$;
  adding to said mixture deionized water and mixing to form a solution in a closed container;
  heating said solution up to 250° C. during 2-8 h;
  opening the container to evaporate the excess of water in the heated product.

In one embodiment, the method for synthetizing any of the compounds of the previous paragraph may comprise the following step:
  introducing the synthetized glassy material between electrodes the electrodes of an electrochemical device;

heating the glassy material up to 170-240° C. and cooling.

In one embodiment, the method for synthetizing any of the compounds of the previous paragraph may comprise the following step:

a stoichiometry mixture of LiCl, LiOH, and one of the following compounds:

Mg(OH)$_2$; Ca(OH)$_2$, Sr(OH)$_2$ or Ba(OH)$_2$, is used; the mixture is introduced in a Teflon reactor with 1-2 drops of deionized water and mixing to form a homogenous paste which is kept closed in the reactor and introduced in a sand bath;

the mixture is heated up to 250° C. and kept for at least 4 h;

the reactor is opened to let the excess of water evaporate;

a glass material synthetized is introduced between two gold square electrodes with 1 cm wide and pressed with the aid of a clip for the electrolyte to gain a regular thickness equal to 1-3 mm;

the glass material produced is heated up to 230° C. and cooled down in the sand bath, 2-5 times under the action of a variable potential difference between −10 V and 10 V with variable frequencies between 100 Hz and 5 MHz.

Another aspect of the present disclosure is related to a method for synthetizing a conductive glass electrolyte, in particular for preparing 5 g, comprising a compound of the formula R$_{3-2x}$M$_x$HalO wherein R is sodium;

M is selected from the group consisting of magnesium, calcium, strontium and barium;

Hal is selected from the group consisting of fluorine, chlorine, bromine, iodine or mixtures thereof;

X is the number of moles of M and 0≤x≤0.01 of comprising the following steps:

mixing a stoichiometry quantity of NaHal, NaOH and one of the following compounds: Mg(OH)$_2$; Ca(OH)$_2$; Sr(OH)$_2$ or Ba(OH)$_2$;

adding to said mixture deionized water and mixing to form a solution in a closed container;

heating the solution up to 70-90° C. for 2-8 h;

increasing the temperature up to 190-250° C. for 2-8 h, maintaining said temperature for at least 2 h;

opening the container to evaporate the excess water in the heated product.

In one embodiment, the method for synthetizing any of the compounds of the previous paragraph may comprise the following step:

introducing the synthetized glass material between electrodes; heating the glass up to 190-230° C. and cooling.

In one embodiment, the method for synthetizing any of the compounds of the previous paragraph may comprise the following step:

a stoichiometry mixture of NaCl, NaOH and one of the following compounds:

Mg(OH)$_2$; Ca(OH)$_2$; Sr(OH)$_2$ or Ba(OH)$_2$ or a stoichiometry mixture of NaCl, NaF, NaOH and one of the following compounds: Mg(OH)$_2$; Ca(OH)$_2$; Sr(OH)$_2$ or Ba(OH)$_2$ is used;

the mixture is introduced in a reactor with 1-2 drops of deionized water and mixed to form a homogenous paste which is kept closed in the reactor and introduced in a sand bath;

the mixture is heated up to 80° C. for 2 h;

the temperature is increased to 120° C. for 24 h;

the temperature is increased to 245° C. for 24 h;

the temperature is maintained for at least 4 h;

the reactor is opened to let the excess of water evaporate;

a glassy material synthetized is introduced between two gold square electrodes with 1 cm wide and pressed with the aid of a clip for the electrolyte to gain a regular thickness equal to 1-3 mm;

the glass material produced is heated up to 230° C. and cooled down in the sand bath;

the glass material is heated up to 140° C. and cooled down in the sand bath 2-5 times under the action of a variable potential difference between −10 V and 10 V with variable frequencies between 100 Hz and 5 MHz.

Another aspect of the present disclosure is related to a method for synthetizing a ion conductive glassy electrolyte, in particular for preparing 5 g, comprising a compound of the formula R$_{3-2x}$M$_x$HalO wherein R is lithium;

M is selected from the group consisting of magnesium, calcium, strontium or barium;

Hal is selected from the group consisting of fluorine, chlorine, bromine, iodine or mixtures thereof;

X is the number of moles of M and 0≤x≤0.01 of comprising the following steps:

mixing a stoichiometry quantity of LiCl, LiOH and one of the following compounds: Mg(OH)$_2$; Ca(OH)$_2$; Sr(OH)$_2$ or Ba(OH)$_2$;

adding to said mixture deionized water, in particular 5-25 ml or 1-2 drops, and mixed to form a solution, in particular an homogeneous paste, in a closed container;

heating said solution up to 250° C. during 2-8 h;

opening the container to evaporate the excess of water in the product;

introducing the glass material synthetized between the electrodes, in particular a glass material synthetized is introduced between two gold square electrodes with 1 cm wide and pressed with the aid of a clip for the electrolyte to gain a regular thickness equal to 1-3 mm;

the glass obtained is heated up to 170-240° C. and cooled down, in particular 2-5 times under the action of a variable potential difference between −10 V and 10 V with variable frequencies between 100 Hz and 5 MHz.

Another aspect of the present disclosure is related to the use of the composition of the formula R$_{3-2x}$M$_x$HalO wherein R is selected from the group consisting of lithium or sodium;

M is selected from the group consisting of magnesium, calcium, barium or strontium;

Hal is selected from the group consisting of fluorine, chlorine, bromine, iodine or mixtures thereof;

X is the number of moles of M and 0≤x≤0.01;

as an enhancer of the ionic conductivity of an electrolyte and/or of the electrochemical window of stability of an electrolyte.

The disclosed subject matter relates to a glassy electrolyte optimized with ultra-fast ionic conduction based on an R$_{3-2x}$M$_x$HalO stoichiometry, in which R is lithium or sodium ion, M is a higher valent cation such as Mg$^{2+}$, Ca$^{2+}$, Sr$^{2+}$, Ba$^{2+}$; and Hal is a halide anion like F$^-$, Cl$^-$, Br$^-$ or I$^-$ or a mixture of halides anions.

The glass-liquid transition is the reversible transition in amorphous materials from a hard and relatively brittle state into a molten or rubber-like state. The glass transition of a liquid to a solid-like state may occur with either cooling or compression. The transition comprises a relatively smooth increase in the viscosity of a material of about 17 orders of magnitude without any pronounced change in material structure. The consequence of this dramatic increase is a glass exhibiting solid-like mechanical properties on the timescale of practical observation. While glasses are often thought of as rigid and completely immobile, it is well known that relaxation processes of one type or another continue to be measurable all the way down to the cryogenic range. Hundreds of degrees below $T_g$, on the other hand, there is frequently an important source of dielectric loss in ordinary glass insulators. This is attributed to mobile alkali ions and, to a lesser extent, protons, in the anionic network. In many cases, for example in solid electrolytes, these quasi-free modes of motion are the focus of special materials interest such as advanced solid electrolytes based on freely mobile cations.

A more operative classification for the glass transition temperature is that at this temperature—or within a few degrees up to for example 50° C.—the specific heat, the coefficient of thermal expansion and eventually the dielectric constant change abruptly. In the Differential Scanning calorimetry (DSC) experiment, $T_g$ is expressed by a change in the base line, indicating a change in the heat capacity of the material. Usually, no enthalpy (latent heat change) is associated with this transition (it is a second order transition); therefore, the effect in a DSC curve is slender and is distinguishable only if the instrument is sensitive.

These solid electrolytes undergo a viscous liquid to a solid-like transition, at $T_g$. Above $T_g$ a non-Arrhenius conductivity regime is observed [$T_g(Li_3ClO) \approx 119°$ C., $T_g(Li_{3-2*0.005}Mg_{0.005}ClO) \approx 109°$ C., $T_g(Li_{3-2*0.005}Ca_{0.005}ClO) \approx 99°$ C., $T_g(Li_{3-2*0.005}Ba_{0.005}ClO) \approx 75°$ C., $T_g(Li_{3-2*0.005}Ba_{0.005}Cl_{0.5}I_{0.5}O) \approx 38°$ C]. One variant of the solid electrolyte developed by us, $Li_{3-2x}Ba_xClO$ (x=0.005), has a conductivity of 25 mScm$^{-1}$, 38 mScm$^{-1}$ and 240 mScm$^{-1}$ at 25° C., 75° C. and 100° C., respectively, in the glassy state or supercooled liquid state. Another variant, $Li_{3-2x}Ba_xCl_{0.5}I_{0.5}O$ (x=0.005), has a conductivity of 121 mScm$^{-1}$ at 50° C. in the supercooled liquid state.

Antiperovskite hydroxides, most of them following the general formula $Li_{3-n}(OH_n)Hal$ or $Li_4(OH)_3Cl$ present ionic conductivities which are surprisingly smaller than the $Li_{3-2}*_xM_xHalO$ vitreous electrolytes, achieving the highest ionic conductivity, 0.010 Scm$^{-1}$, at 250° C. (for $Li_5(OH)_3Cl_2$). Nevertheless, they are observed in our samples prior to the formation of the glasses and they may have an surprisingly important role in glass formation since the translational symmetry characteristic of a homogeneous fluid is broken by exposure to an external force field, in the vicinity of a confining surface (which may be regarded as the source of an external field), or in the presence of an interface between coexisting phases.

DESCRIPTION OF THE FIGURES

For a better understanding of the solution, the attached figures are joined, which represent preferred embodiments of the invention which, however, these figures are not intended to limit the scope of the present invention.

DETAILED DESCRIPTION

The present disclosure describe the novel type of glasses, and method of obtain thereof.

Synthesis, Characterization and Neutron Scattering

In an embodiment, the preparation of Li$_3$ClO and corresponding doped solid electrolyte samples consisted in pre-drying LiCl, and Li, Mg, Ca or Ba hydroxides since most of them are highly hygroscopic, weighing the stoichiometric amounts and mixing them. Then, by adding a few deionized water drops, a paste was formed and introduced in a Teflon reactor, which was closed. The reactor was heated at 230-260° C. for 2-3 hours before it was opened to let the water evaporate for approximately 1 h. Then it was closed in glassware and allowed to cool to room temperature. A vacuum pump was used to dry the water out. A few hours are needed for the sample to become 100% of the amorphous Li$_3$ClO or its doped homolog. Pellets were obtained as well (with a cold press).

The part of the sample designated for EIS experiments was manipulated in air, after synthesis, since it proportionated the formation of hydroxides that were beneficial to glass formation.

The cooling processes took place in the sand bath, it was slow, in the screw pressed cell, and most of the times EIS experiments were performed during cooling. Glasses were obtained after hydroxides ran out (eventually this phase works as a confining surface, helping glass formation).

Figure 1:
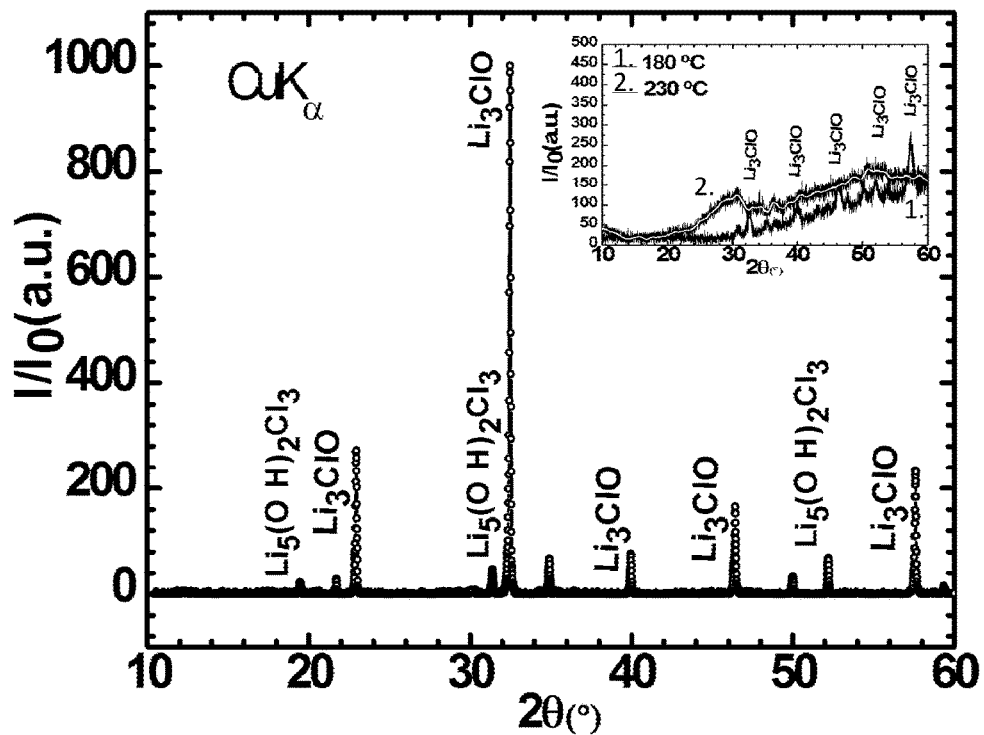
FIG. 1: XRD diffractogram of a sample of $Li_3ClO$ at room temperature. There is evidence of small amount of an hydroxide phase, possibly $Li_5(OH)_2Cl_3$, due to sample manipulation. At 180° C. (graph right above, FIG. 1 (1)), there is little evidence of the hydroxide but the presence of crystalline $Li_3ClO$ is still clear, although an amorphous phase becomes visible. At 230° C. (graph right above, FIG. 1 (2)), only an amorphous phase is clearly distinguishable. The XRD radiation used was CuK$_\alpha$.
Figure 2:
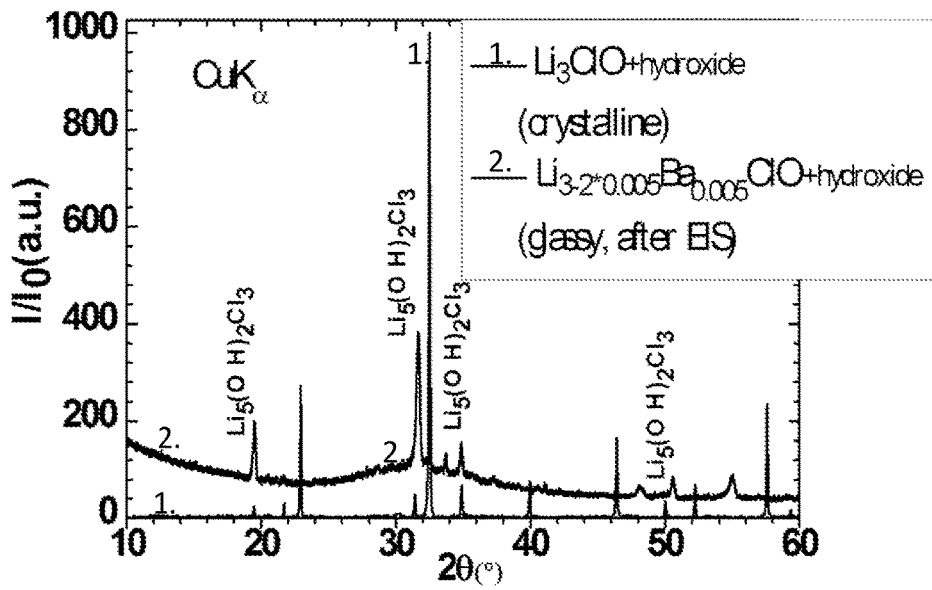
FIG. 2: XRD diffractogram of a $Li_3ClO$—crystalline sample (the same as in FIG. 1 (1)) and of $Li_{3-2*0.005}Ba_{0.005}ClO$—glassy (2) at room temperature after EIS measurements (after six cycles of heating/cooling). Compton's scatter, which is inelastic scattering and amorphous scatter related with the glass is observed. There is evidence of the presence of an hydroxide phase, possibly $Li_5Cl_3(OH)_2$ (the same as in FIG. 1), that due to sample's air exposed manipulation is inevitable and starts to form at the surface.

In an embodiment, samples were submitted to X-ray Diffraction (XRD) in a Panalytical instrument, using CuK$_\alpha$ radiation, to determine the amount of the product present in the sample as observed in FIG. 1. XRD measurements were also performed after EIS experiments to determine if the material was amorphous. An example of the latter measurements can be observed in FIG. 2. Mg, Ca, Sr or Ba quantitative analysis was performed by means of Atomic Absorption Spectroscopy (AAS).

The high sensitivity of ionic conductivity of glasses to chemical composition is well known, therefore different doping elements and compositions Li$_{3-2}$*$_x$M$_x$HalO (for example, x=0 in Li$_3$ClO; x=0.002, 0.005, 0.007 and 0.01 for M=Mg and Ca; x=0.005 for M=Ba and Hal=Cl or Hal=0.5Cl+0.51) were synthesized. To obtain glasses, the samples were mounted into a gold cell (described in ionic and electronic conductivity measurements), in air atmosphere, and performed heating-cooling cycles up to 250° C. Eventually, after the first heating-cooling cycle (sample was slowly cooled down and protected from moisture), the ionic conductivity grows abruptly.

Differential Scanning calorimetry experiments (DSC) in alumina closed crucibles and Ar flowing atmosphere, using dried powder and slightly pressed powder, show that after the first cycle, the hydroxide's melting peak cannot be distinguished anymore. The latter also shows a baseline anomaly that is probably due to the glassy transition and a clear first order transition corresponding to the melting peak of Li$_{3-0.01}$Mg$_{0.005}$ClO as it can be distinguished in FIG. 3. A Labsys-Setaram instrument was used to perform the latter measurements.

The role of the lattice during hopping and diffusion was established by means of neutron inelastic incoherent scattering (IINS). A sample holder stick and a lithium-metal symmetric battery cell (screw brass collectors, quartz glass tube with approximately 2.5 cm of diameter, and about 3 cm of sample—distance between lithium electrodes) were prepared for these experiments at the Los Alamos Neutron Scattering Center (LANSCE). Temperature, current and applied frequency could vary.

Ionic and Electronic Conductivity Measurements

Figure 4:
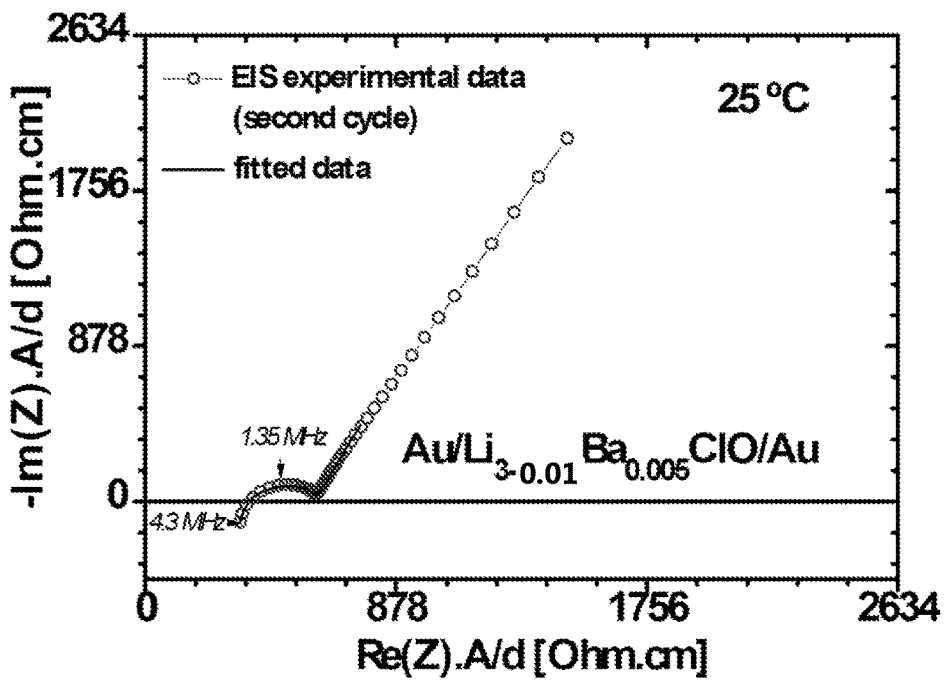
FIG. 4: EIS experimental and fitted data using the equivalent circuit previously described. Nyquist impedance and correspondent fitting curve for the $2^{nd}$ cycle of a sample containing $Li_{3-2*0.005}Ba_{0.005}ClO$, at 25° C. A is the surface area, A=1.76 cm$^2$ and d the thickness, d=0.2 cm.
Figure 5:
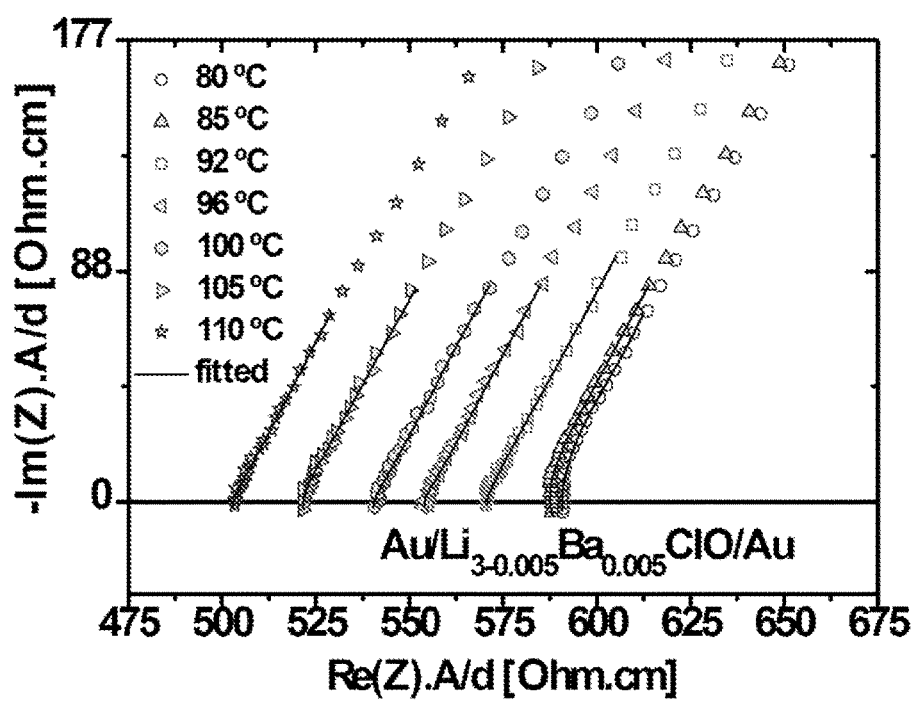
FIG. 5: EIS experimental and fitted data using the equivalent circuit previously described. Nyquist impedance for the $2^{nd}$ cycle of a sample containing $Li_{3-2}*_{0.005}Ba_{0.005}ClO$, at different temperatures after the glass transition. A is the surface area and d the thickness.

Electrochemical Impedance Spectroscopy (EIS) was performed in a cell using either gold or stainless steel (blocking electrodes) that was heated up in a sand bath, in air atmosphere or in a glovebox in Ar and/or air (water vapour<10%). Our gold symmetric cell has about 1.77 cm$^2$ of surface area. It consisted of two disk foils of gold separated by the sample with a thickness of about less than 5 mm (usually 1-3.0 mm) and it was pressed tightly with a screw. Our stainless steel cell was bulky and could contain a sample with the same dimensions as the gold one. In the latter cell, blocking electrodes could be stainless steel or copper (just for temperatures near room temperature). This cell was seldom used. The instrument used is a Bio-Logic SP240. Experiments were conducted in the temperature range 25 to 255° C. The frequency range was 5 MHz-0.1 Hz. Ionic conductivity was calculated using Nyquist impedance of an equivalent circuit containing a passive resistance in series with a constant phase element in series with circuit containing a capacitor in parallel with a resistance. The latter resistance is the solid electrolyte's resistance which plays the role of the dielectric in an ideal parallel-plate capacitor. When the resistance to ionic conduction becomes too small and Faraday's induction caused by the cables unavoidable and prominent at high frequencies, a non-ideal inductive element was added in series to the previous circuit. FIGS. 4 and 5 show EIS measurements' data for a sample containing Li$_{3-2}$*$_{0.005}$Ba$_{0.005}$ClO tested in a symmetric gold cell as previously described, for different cycles and temperatures. Tests in the empty cell and with AgI were performed to control the procedures and establish analysis methods.

Cyclic voltammetry tests were performed in the stainless steel cell with a lithium electrode as reference electrode and a counter electrode of copper or stainless steel. Chronopotentiometry was performed in a lithium symmetric cell equivalent to the gold one previously described. Three measurements intercalated by an open circuit interval were performed containing 20 cycles each of 40 minutes (20 minutes at a positive current and 20 minutes at a negative current). Measurements were performed in an Ar-dry glovebox.

Calculations

In an embodiment, density Functional Theory (DFT) calculations with Projector Augmented Wave (PAW) pseudopotentials as implemented in the Vienna Ab initio Simulation Package (VASP) code, were performed. A plane wave cut-off of 500 eV, and k-mesh of 4×4×4 were used. Calculations were implemented for crystalline electrolytes in real space and were performed within the P1 space group supercells containing at least 134 atoms. Some supercells contained as many atoms as possible, 270 atoms or more, to allow better approximations with the real $Ba^{2+}$, $Ca^{2+}$ or $Mg^{2+}$ concentrations. The Generalized Gradient Approximation (GGA), and the Perdew-Burke-Ernzerhof (PBE) functional were used, and no magnetic moments were included in the model. The Heyd-Scuseria-Erznerhof (HSE06) functional was used to calculate band structure and electronic Density of States (DOS) to determine the lowest unoccupied molecular orbital (LUMO) and the highest occupied molecular orbital (HOMO).

Ionic conduction in solids occurs by ion hopping from a crystal lattice site to another by vacancy mechanism; therefore it is convenient to have a partial occupancy of energetically equivalent or near-equivalent sites. In favourable structures, the defects may be mobile, leading to high ionic conductivity. While the rate of ion transport in a crystalline solid is dictated by the diffusivity and concentration of the vacancies mediating ion transport, the open structure of inorganic glassy materials facilitates the process of ionic hopping and results in enhanced conductivity. Inorganic glasses thus represent an attractive material class for electrolyte applications. An advantage of inorganic glasses is single-cation conduction; they belong to the so-called decoupled systems in which the mode of ionic conduction relaxation is decoupled from the mode of structural relaxation.

Figure 6:
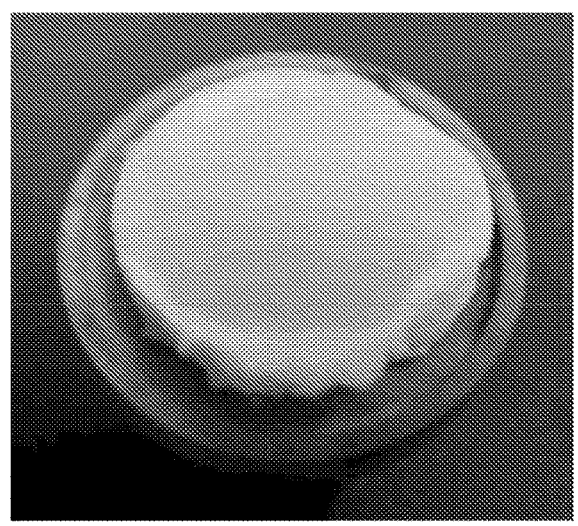
FIG. 6: Photograph of a glassy sample of $Li_{3-2}*_{0.005}Ca_{0.005}ClO$.

Comparing the temperature dependence of the relaxation time of the structure and conduction for inorganic glassy liquids with, say, organic polymers shows that the former exhibit a decoupling character capable of yielding higher single ion conduction in the glassy state (FIG. 6). Single cation conduction is associated with fewer side reactions and significantly wider electrochemical stability windows, which can be up to 10 V.

Electronic properties, such as the band structure and Density of States (DOS) were also calculated by means of DFT using the GGA functionals and the Hyed-Scuseria-Erznerhof (HSE06) functionals. In FIG. 7a, electronic band structure calculations using GGA are shown as well as the correspondent band gap of 4.74 eV. FIG. 7b shows a HSE06 calculation and its correspondent band gap, $E_g$, value of 6.44 eV, which indicates a wide range of electrochemical stability for the crystalline material.(The band gap calculated using HSE06 hybrid functional seems to agree more with experiments than the one calculated using GGA functional as generally expected. FIG. 7c shows voltammetry graphs correspondent to four experiments in which it can be observed that no substantial oxidation of $Li_3ClO$ or $Li_{3-2}*_{0.005}Ba_{0.005}ClO$ at 130° C. can be detected up to 8 V, which covers all the negative-positive electrode-pair voltage windows for Li batteries. The electrical conductivity was obtained from these voltammetry cycles using the HebbWagner (H-W) method. In a polarization measurement, under steady state conditions, in a $Li/Li_3ClO/Cu$ cell with a ion blocking electrode such as Cu, $\partial I/\partial V = -A\sigma e/d$ where I is the electrical current, V is the applied voltage (E in FIG. 7c), A the cross-sectional area of the electrolyte (with j=I/A), d the thickness of the electrolyte and $\sigma e$ its electronic conductivity. The derivative $\partial I/\partial V$ yields de electronic conductivity in the electrolyte near the end adjacent to the blocking electrode.

For $Li_3ClO$ at 130° C. in the 1.4-2.5 V interval, $\sigma_e = 9.2 \times 10^{-9}$ Scm$^{-1}$, and in the interval 2.55-2.82 V, $\sigma_e = 1.18 \times 10^{-7}$ Scm$^{-1}$. For $Li_{3-2}*_{0.005}Ba_{0.005}ClO$ at 130° C. for the first cycle and over the interval 4.1-5.97 V, $\sigma_e = 6.77 \times 10^{-8}$ Scm$^{-1}$. For the second cycle, and in the range 2.07-5.37 V, $\sigma_e = 1.05 \times 10^{-8}$ Scm$^{-1}$. The latter yields a transport number, $t_i = \sigma_i/(\sigma_i + \sigma_e)$, near unity as required for good quality solid electrolytes; $\sigma_i$ is the ionic conductivity.

Figure 8:
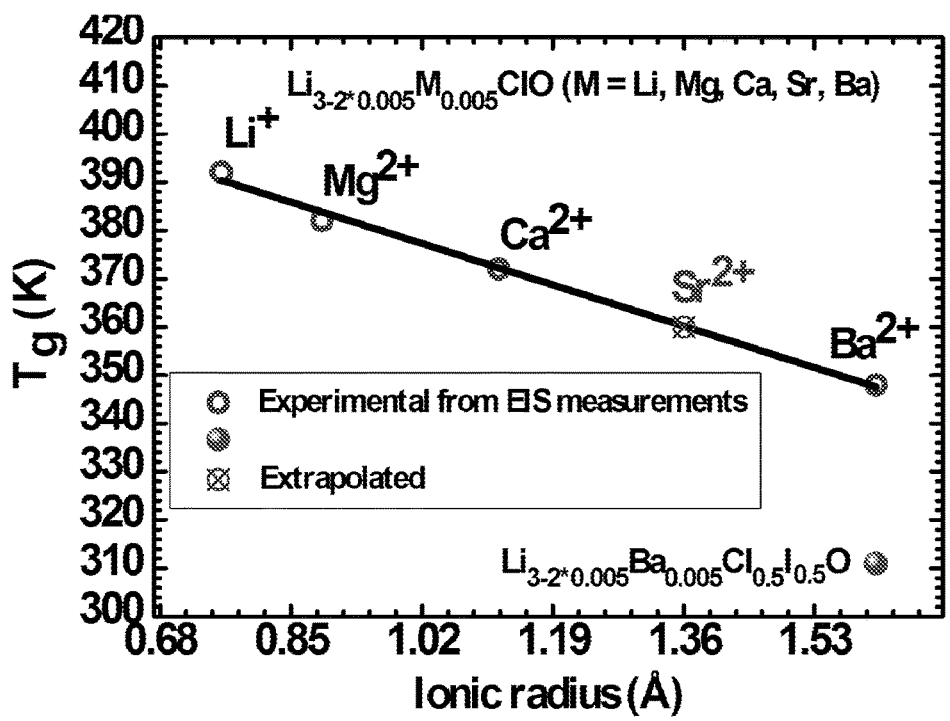
FIG. 8: Glass transition temperature versus ionic radius (of the $Li^+$ ion, in $Li_3ClO$, of the doping ion (M) in $Li_{3-2}*_{0.005}M_{0.005}ClO$, M=$Mg^{2+}$, $Ca^{2+}$, $Sr^{2+}$, $Ba^{2+}$ and of $Li_{3-2}*_{0.005}M_{0.005}Cl_{0.5}I_{0.5}O$). Excluding $Sr^{2+}$, all glass transition temperatures were obtained by Electrochemical Impedance Spectroscopy (EIS). Ionic radiuses were obtained from the literature.

From the experimental study and DFT analysis, it was observed that the ionic radius of the doping atom plays an important role in the liquid/solid-like transition; namely, the larger the doping ion radius the lower the glass transition temperature as it is shown in FIG. 8. This effect arises due to the disorder that the impurity introduces in the crystal structure, especially the part related to the enthalpy. Consequently, very high ionic conductivities can be obtained at relatively low temperatures, e.g. 25° C. or lower, in high ionic radius doped glassy samples.

Figure 9:
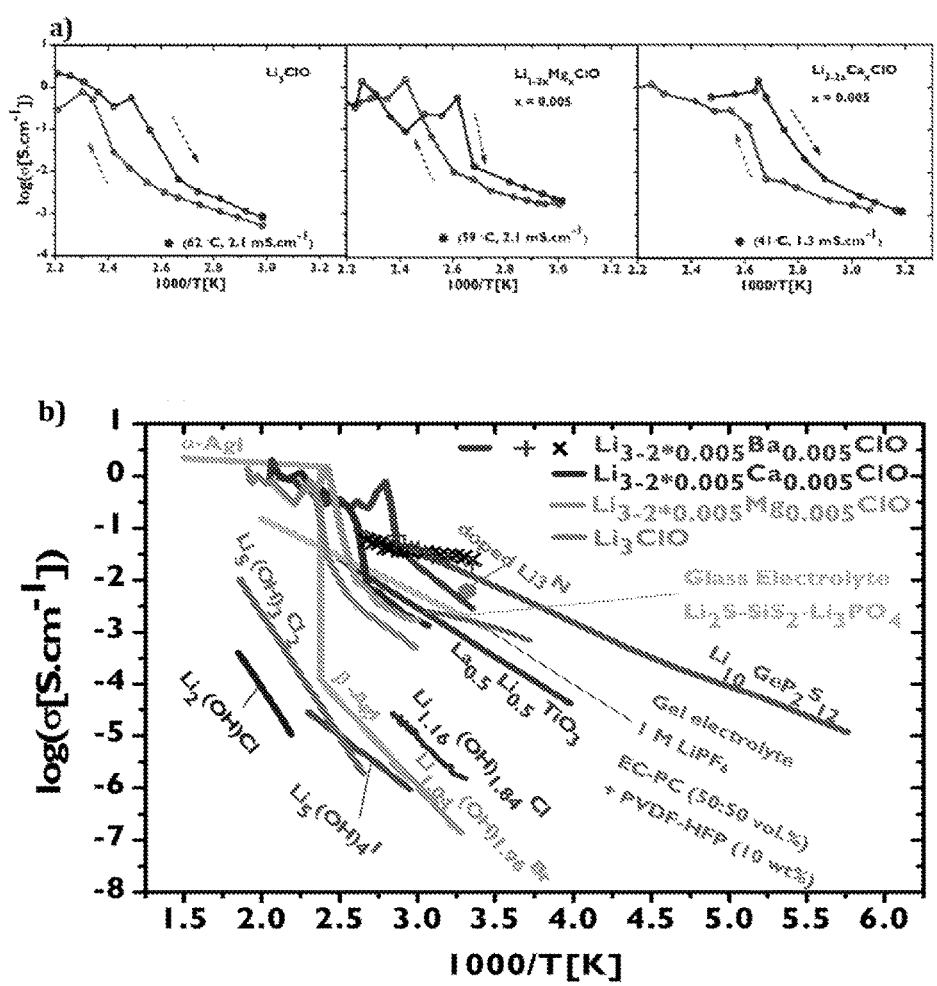
FIG. 9: Ionic conductivities of plain and doped $Li_3ClO$. a) Logarithm of the ionic conductivity of $Li_3ClO$, $Li_{3-2}*_{0.005}Mg_{0.005}ClO$ and $Li_{3-2}*_{0.005}Ca_{0.005}ClO$ versus 1000/T [K] during heating and cooling. b) Comparison between the logarithm of the ionic conductivities of hydroxides that can be formed during $Li_{3-2}*_xM_xHalO$ synthesis; some known solid electrolytes and a gel electrolyte commonly used in Li-ion batteries; $Li_3ClO$ and $Li_{3-2}*_{0.005}M_{0.005}ClO$ (M=Mg, Ca, Sr, and Ba) during heating. Line and symbols +, × for $Li_{3-2}*_{0.005}Ba_{0.005}ClO$ glassy samples in their $2^{nd}$, $3^{rd}$ and $4^{th}$ heating/cooling cycles, respectively. EIS measurements were performed during heating.

FIG. 9 shows the ionic conductivities for solid-like and supercooled liquid samples of plain and doped electrolytes. In FIG. 9a, not only can the glass transitions be observed, but also the ionic conductivity hysteresis resulting from heating the followed by cooling.

Figure 10:
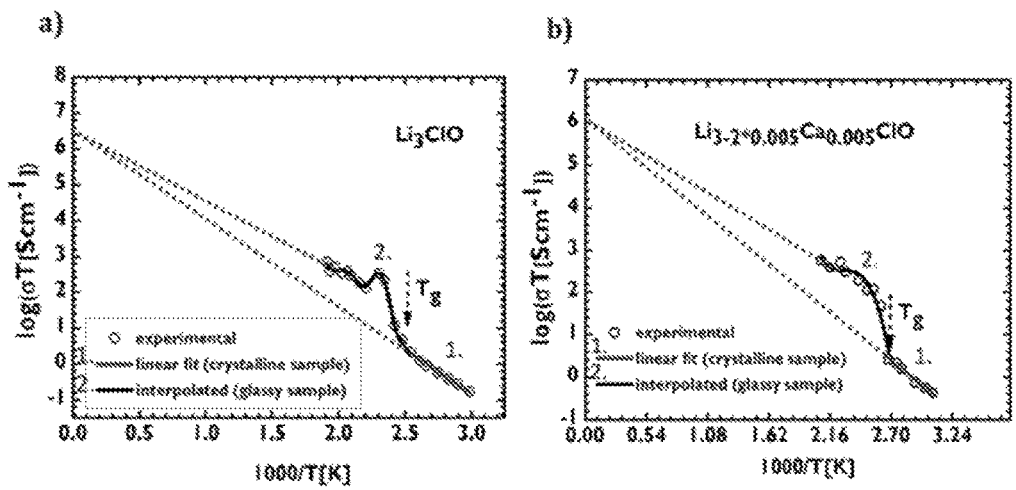
FIG. 10: Log($\sigma$T) versus 1000/T graphs, to highlight identical values for the extrapolated data of the $\sigma$T term in the solid-like glass and supercooled liquid domains when the temperature, T, approaches infinity; a) for a sample of $Li_3ClO$; b) for a sample of $Li_{3-2}*_{0.005}Ca_{0.005}ClO$.

A peak immediately before the ergodicity breaking transition is observed as well. Ionic conductivity dispersion, probably due to decoupling of diffusivity from viscosity, is observed in the non-Arrhenius regime in FIGS. 9a and 9b. For a material with ionic conductivity, $\sigma$, that can be measured above and below $T_g$, the extrapolated data for the $\sigma T$ term in the two domains should give identical values when the temperature, T, approaches infinity. This finding is verified in the current work and can be observed in FIG. 10.

$Li_3ClO$ behaves as a solid-like glass (following Arrhenius law) below $T_g$; above $T_g$ it becomes a supercooled liquid showing a non-Arrhenius behaviour. It was observed a similar kind of behaviour for the doped material, although this behaviour depends on the history of the material as well (as it may be observed from the comparisons between the $2^{nd}$ and $4^{th}$ cycles in FIG. 9b for $Li_{3-2}*_{0.005}Ba_{0.005}ClO$. Moreover, doping is not necessary to obtain a glass, but it is helpful to get it at lower temperatures.

Figure 11:
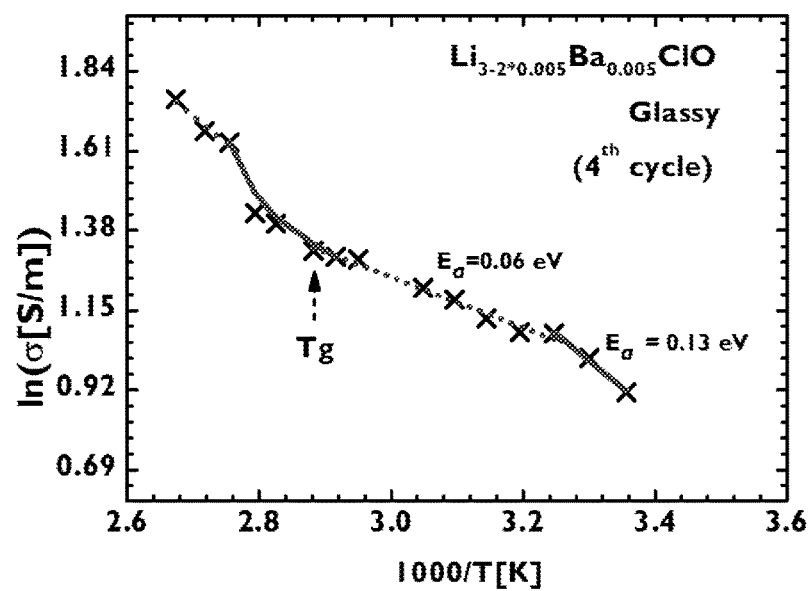
FIG. 11: Pseudo-Arrhenius plot and "apparent" activation energies for a $Li_{3-2}*_{0.005}Ba_{0.005}ClO$ sample during the $4^{th}$ heating/cooling cycle. The sample was submitted to an EIS cycle on every heating. The sample was glassy and therefore it is not expected an Arrhenius behaviour at least above $T_g$.
Figure 12:
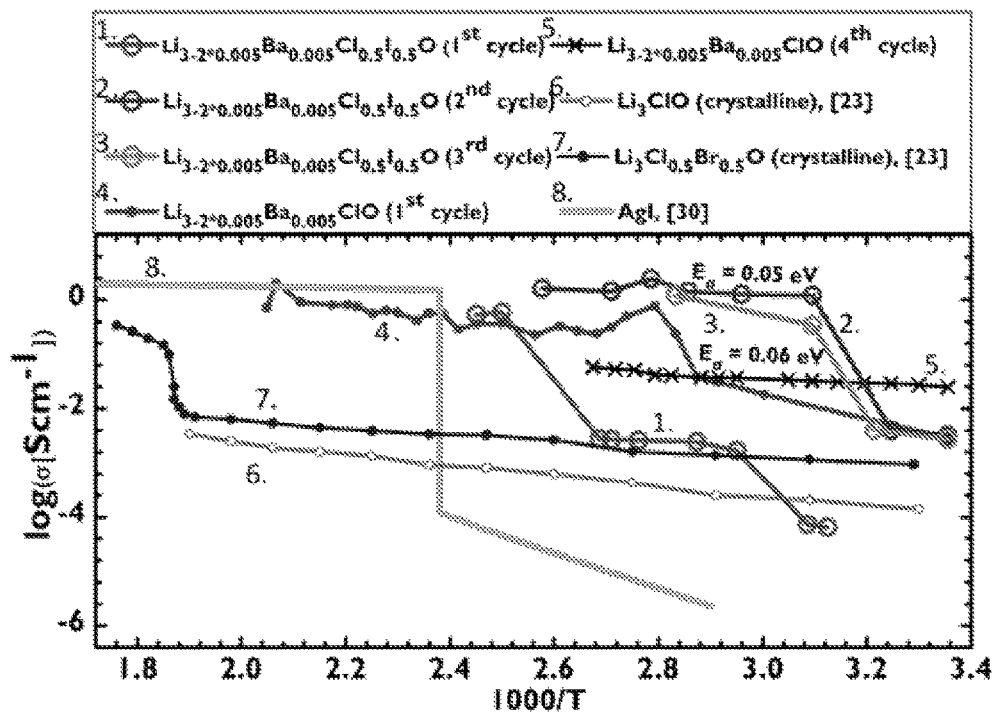
FIG. 12: Ionic conductivities of plain and doped $Li_3ClO$. Logarithm of the ionic conductivity of $Li_3ClO$ (Y. Zhao and L. L. Daemen, *J. Am. Chem. Soc.* 2012, 134, 15042), Li$_3$Cl$_{0.5}$Br$_{0.5}$O (Y. Zhao and L. L. Daemen, *J. Am. Chem. Soc.* 2012, 134, 15042), AgI (H. Mehrer, Diffusion in Solids Fundamentals, Methods, Materials, Diffusion-Controlled Processes, Springer Series in Solid-State Sciences, Vol. 155, 1st ed. 2007), Li$_{3-2}$*$_{0.005}$Ba$_{0.005}$ClO (1$^{st}$ and 4$^{th}$ cycles) and Li$_{3-2}$*$_{0.005}$Ba$_{005}$Cl$_{0.5}$I$_{0.5}$O (1$^{st}$ to 3$^{rd}$ cycles) versus 1000/T [K] during heating.

A $Li_{3-2}*_{0.005}Ba_{0.005}ClO$ sample that slowly cooled down after the $3^{rd}$ heating/cooling cycle—submitted to EIS measurements on heating—shows unusually high ionic conductivity at 25° C. as expected and as it is shown on FIG. 9b (+ symbols). In FIG. 11 the pseudo-Arrhenius curve for the latter sample in the $4^{th}$ cycle can be observed. Although linear behaviour it is not expected, at least above $T_g$, activation energies as low as 0.06 eV can be observed in the temperature range of 35° C. to 74° C. The glass transition can be observed in FIG. 9b (× symbols) and in FIG. 11, although it is much smoother than in previous cycles, probably indicating higher similitude between the supercooled liquid and the solid-like material highlighting that the glass dynamics depends very highly of the cooling rate, among other factors.

Figure 7:
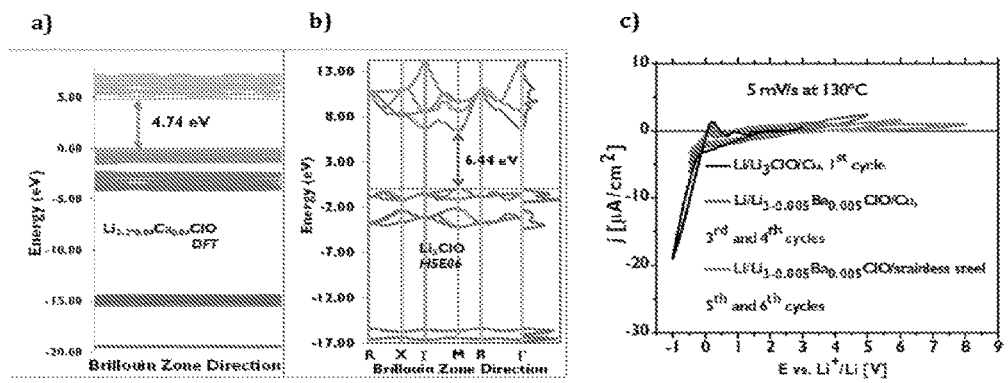
FIG. 7: Electrical properties of plain and doped $Li_3ClO$. a) Calculated electronic band structure for the $Li_{3-2}*_{0.04}Ca_{0.04}ClO$ solid crystal within the Brillouin zone directions, using DFT-GGA as implemented in VASP. The band gap of 4.74 eV is highlighted after the Fermi level which corresponds to 0 eV. b) $Li_3ClO$ calculated electronic band structure within the Brillouin zone directions, using HSE06. The band gap of 6.44 eV highlights the difference between Eg calculated with DFT-GGA and HSE06. c) Voltammetry for different cells and doped electrolytes, at 130° C., emphasizing the stability of the electrolytes up to 8 V.

Nonetheless, for lithium batteries, the glassy phase, $Li_{3-2}*_xM_xHalO$, offers higher ionic conductivity as it is shown in FIG. 9b and superior chemical stability compared with those materials, as shown in FIG. 7. Furthermore, unlike Ti and Ge containing materials, $Li_{3-2^*x}M_xHalO$ does not react with lithium-metal and offers a wider window of electrochemical stability.

Moreover, from the air, the only element that should be avoided—at least after synthesizing a highly conductive glass—should be water vapour, which makes our electrolyte an excellent candidate to be used in lithium-air batteries with lithium-metal anode.

Figure 13:
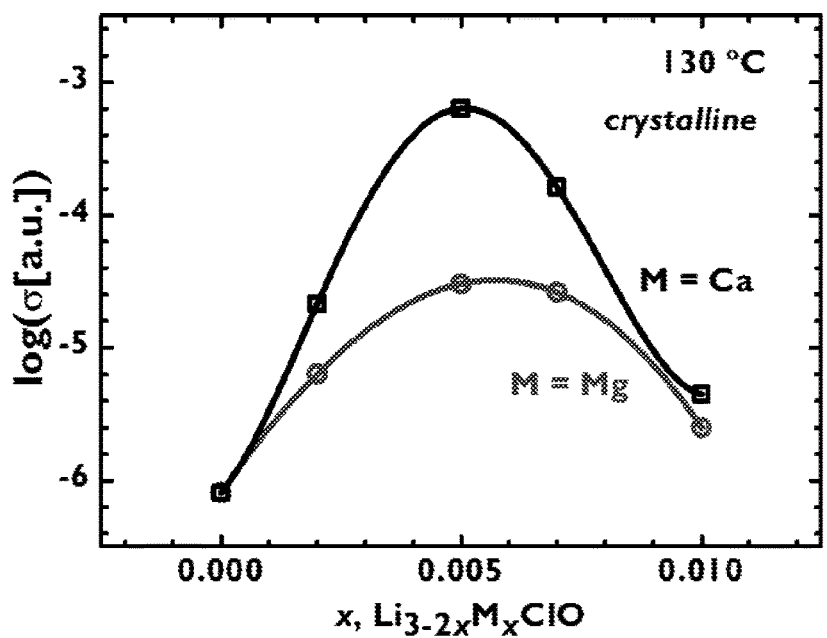
FIG. 13: The experimental ionic conductivity versus concentration for Li$_{3-2}$*$_x$Ca$_x$ClO and Li$_{3-2}$*$_x$Mg$_x$ClO. These results were obtained in the stainless steel non-optimized cell. Electrodes were of stainless steel. The sample cannot be pressure tight as in the gold cell, and most likely the samples did not become glasses.

Doping with $Ba^{2+}$ enhances this effect even further since larger doping ion radius in this case results in higher anisotropy of the lattice, and this seems to be in favour of higher ionic conductivity. However, such an enhancement is limited by other mechanisms such as the hopping ion trapping in the vicinity of the doping ion; which is less likely to occur in $Li_{3-2}*_{0.005}Ba_{0.005}Cl_{0.5}I_{0.5}O$ since the presence of $I^-$ in the centre of the cube will expand the lattice, as described to occur in $Li_3Cl_{0.5}Br_{0.5}O$. FIG. 13 shows an optimal composition (x) for $Li_{3-2x}Mg_xClO$ and $Li_{3-2x}Ca_x$-$ClO$.

Figure 14A:
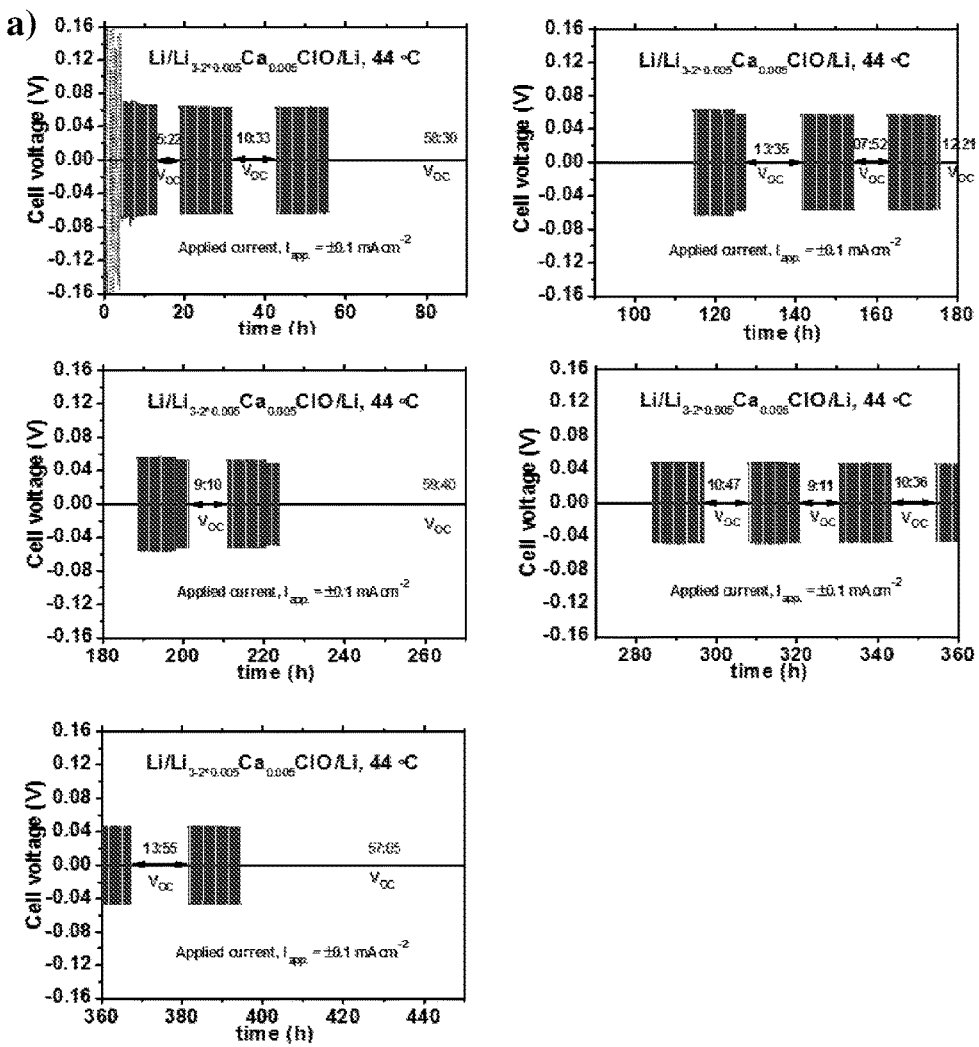
FIG. 14: Cycle stability of the solid electrolyte versus Li-metal. a) Chronopotentiometry emphasizing cycling stability of a Li/Li$_{3-2}$*$_{0.005}$Ca$_{0.005}$ClO/Li cell at 44° C. V$_\infty$ stands for open circuit voltage. The applied current (I$_{app}$)=±0.1 mAcm$^{-2}$. b) Zoom of the graph in a) showing the stability of the Li/Li$_{3-2}$*$_{0.005}$Ca$_{0.005}$ClO/Li cell.
Figure 14B:
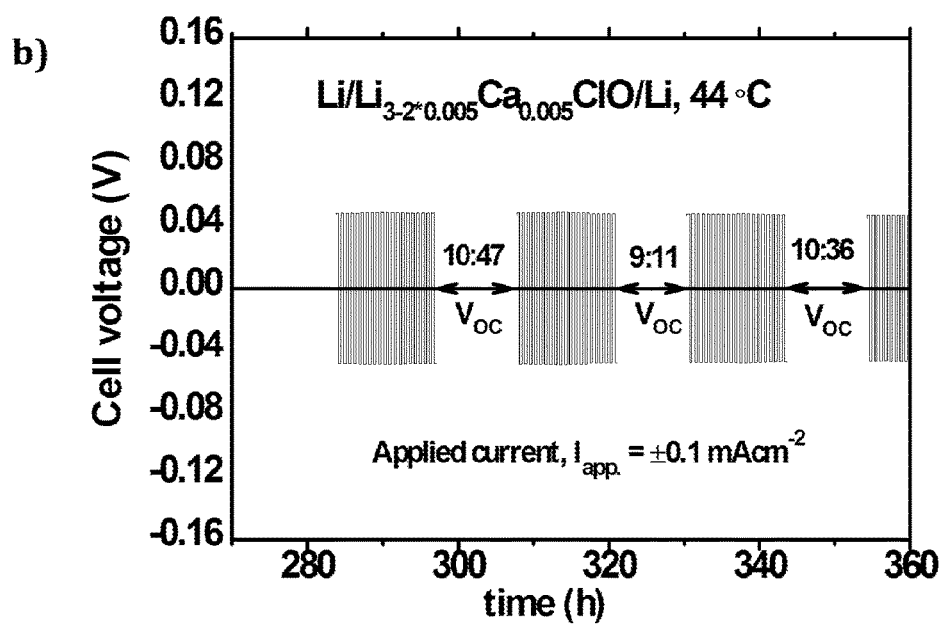

A symmetric $Li/Li_{3-2}*_{0.005}Ca_{0.005}ClO/Li$ cell was configured to demonstrate the cyclability and long-term compatibility of $Li_{3-2}*_{0.005}Ca_{0.005}ClO$ with metallic lithium. FIGS. 14a and b shows the voltage profile of the cell cycled near room temperature, at 44° C. At this temperature, the cell presented a voltage of 46.0 mV at a current density of 0.1 $mAcm^{-2}$. The direct current (dc) conductivity derived from the symmetric cell was 0.27 $mScm^{-1}$—obtained by chronopotentiometry as shown in FIGS. 14a and 14b—which is relatively close to the alternating-current (ac) conductivity of 0.85 $mScm^{-1}$ obtained from electrochemical impedance spectroscopy measurements extrapolated for 44° C. Small interfacial resistance between the lithium electrode and the solid electrolyte was observed, further confirming that the $Li_{3-2}*_{0.005}Ca_{0.005}ClO$ is completely compatible with metallic lithium. The cell showed excellent cyclability at 44° C. as illustrated in FIGS. 14a and 14b, not showing signs of resistance increase during more than 460 h being much more stable than many other electrolytes. These results prove the ability of the glass to be used in Li batteries for electronic device.

Moreover, the ionic conductivity increases until above 220 h, as shown in FIG. 14a, indicating that, even at 44° C., the sample will become partially amorphous eventually due to electrochemical cycling.

The solid electrolyte $Li_3ClO$ structure employs abundant $Li^+$ (high concentration of mobile charge carriers) and non-toxic elements and is easily processed, using wet chemistry at relatively low temperatures (240° C. to 310° C.), which is another argument for inexpensive and environmentally-friendly fabrication. Samples were annealed in a pressure tight wafer of Au—in the cell setup—at up to 250° C. Seldom was it needed more than one cycle for the sample to become partially vitreous and highly conductor. A glassy surface and structure is visible to the eyesight after heating and cooling in FIG. 6 and as denoted in FIG. 2. The sample can become transparent on melting.

It is likely that the precursor hydroxides have an important role in product formation promoting the contact between the reagent compounds powders. These hydroxides are antiperovskite structures, most of them following the general formula $Li_{3-n}(OH_n)Hal$. Their ionic conductivities are considerably smaller than the $Li_{3-2}*_xM_xHalO$ vitreous electrolytes. In fact, the hydroxide recurrently formed was $Li_5(OH)_3Cl_2$ and/or $Li_4(OH)_3Cl$ but it transforms into $Li_{3-2}*_xM_xHalO$ after the first cycle as it can be inferred from Differential Scanning calorimeter (DSC) measurements shown in FIG. 3.

Figure 3:
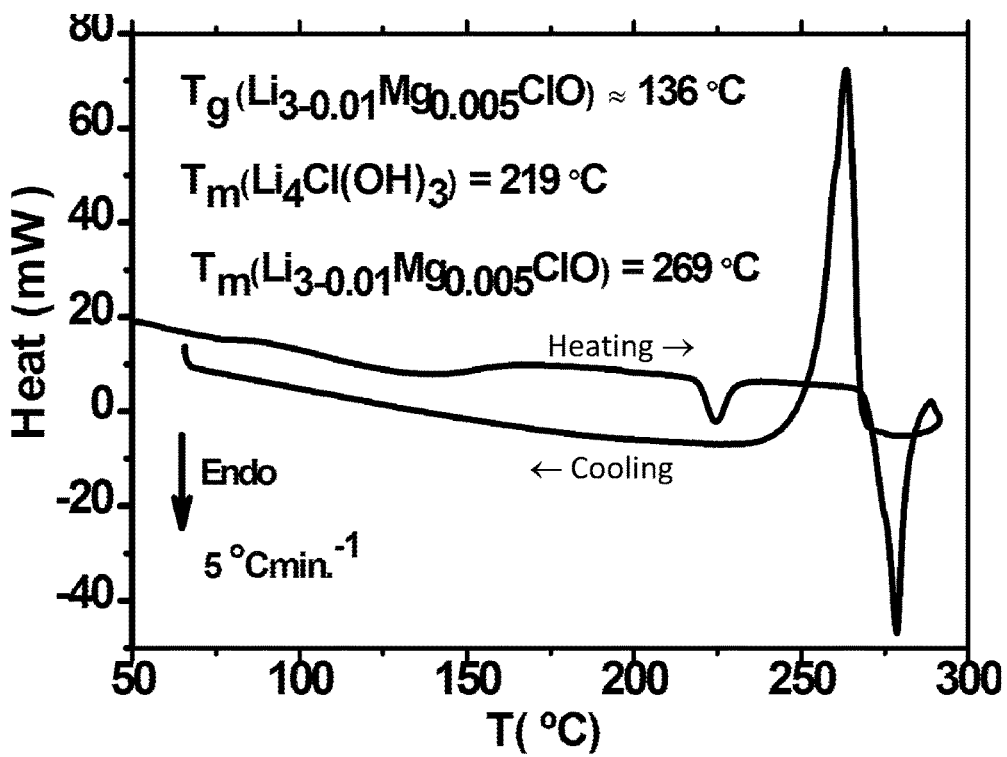
FIG. 3: Differential Scanning calorimetry (DSC). DSC curves for a sample of $Li_{3-2}*_{0.005}Mg_{0.005}ClO$ during heating and cooling, at 5° C./min, eventually showing the glass transition (baseline anomaly) and first order transition temperatures (melting corresponds to endothermic incidents (heating curve) and to an exothermic incident on the cooling curve).

The glass transition of $Li_{3-2}*_{0.005}Mg_{0.005}ClO$ in DSC measurements seems to occur at $T_g$~136° C. as observed in FIG. 3, which is in agreement with the ionic conductivity results. Melting of $Li_{3-2}*_{0.005}Mg_{0.005}ClO$ occurs at $T_m$=269° C. as the correspondent endothermic peak demonstrates in FIG. 3. A glass transition, $T_g$, is linked via an empirical relationship with the melting temperature $T_m$, $T_g$~(⅔)$T_m$. We obtained, $T_g/T_m$~0.75, by means of DSC, and $T_g/T_m$~0.71, by conductivity measurements, which is a good approximation to the empirical factor of 0.67.

Figure 15:
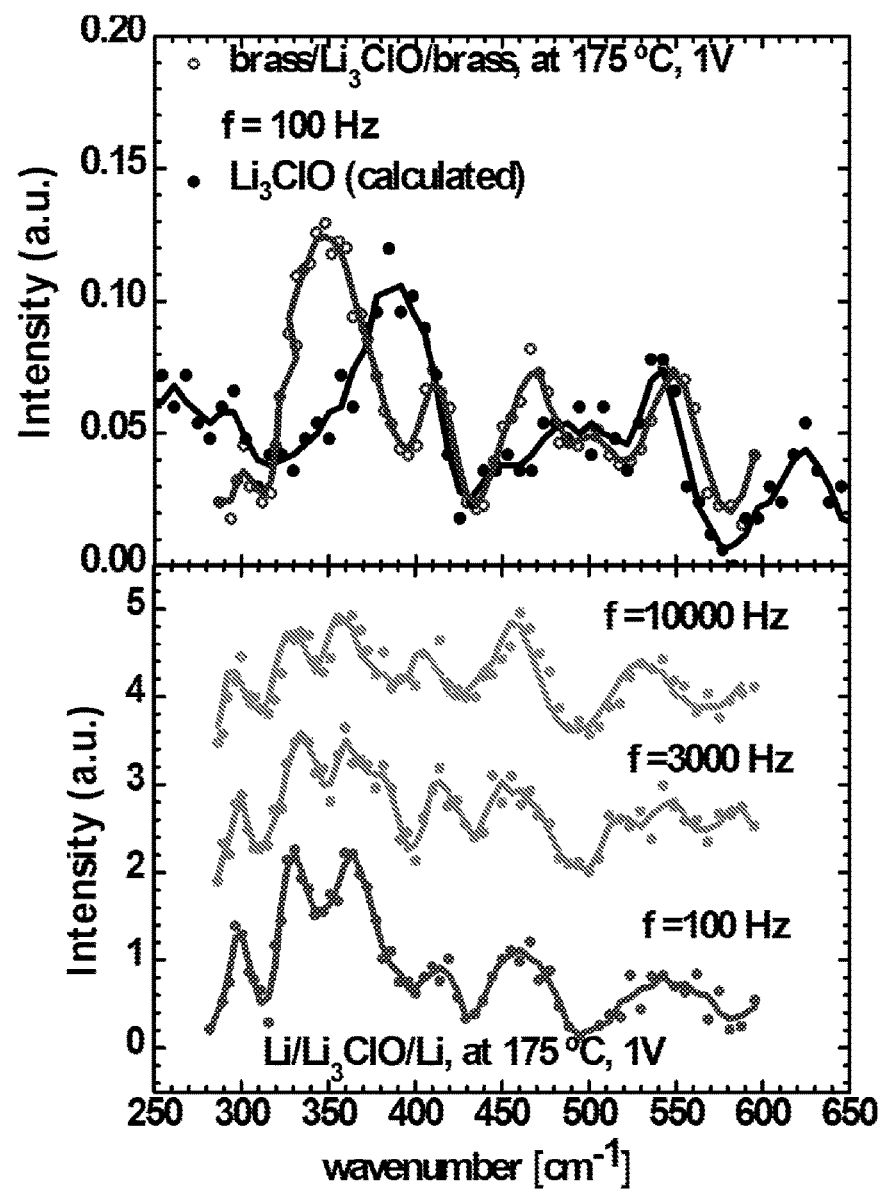
FIG. 15: Lattice vibration spectra of the Li$_3$ClO. Above: the calculated spectrum and IINS for a brass/Li$_3$ClO/brass cell (blocking electrodes). Below: the IINS for a Li/Li$_3$ClO/Li cell. The dependence from the applied frequency of the intensity of the spectra peaks highlights the jump frequency. This effect is notorious for the peaks around 350 cm$^{-1}$. In the calculated spectra, incoherent cross-sections of each element were not weighed. Additionally, calculations did not take into account the overtones.

The phonon density of states was calculated using DFT and compared with Incoherent Inelastic Neutron Spectroscopy (IINS) spectra. The role of the lattice during hopping and diffusion was established experimentally as a function of electrodes' temperature, voltage and applied frequency. Most of the vibration modes maintain a constant intensity with the applied frequency as observed in FIG. 15. The effect is likely to be associated with the crystalline behaviour since the experimental conditions were not favourable to glass formation.

For 320-380 $cm^{-1}$ wavenumbers (~1013 Hz), the intensity varies with the applied frequency, being higher at f=100 Hz and lower at f=104 Hz.

This is most likely the jump frequency (~1013 Hz) as the eigenvectors associated with phonons suggest, which implies that at higher frequencies more ions have jumped already.

It is important to mention that the $Li_3ClO$-crystalline density is as low as 2.07 $gcm^{-3}$ ($Li_{3-2}*_{0.005}Ca_{0.005}ClO$-crystalline is 2.09 $gcm^{-3}$ and $Li_{3-2}*_{0.005}Ba_{0.005}ClO$-crystalline is 2.28 $gcm^{-3}$). At 200° C. $Li_3ClO$ density is ~1.96 $gcm^{-3}$. Liquid electrolytes in lithium-ion batteries consist of lithium salts, such as $LiPF_6$ (1.50 $gcm^{-3}$) or $LiClO_4$ (2.42 $gcm^{-3}$) in an organic solvent, such as ethylene carbonate (1.3 $gcm^{-3}$) or dimethyl carbonate (1.07 $gcm^{-3}$).

Although the cell will not be lighter just by replacing the liquid by equal volume of the solid electrolyte and even if moisture has to be avoided likewise; merely a thin film of solid electrolyte is needed with no separator or sophisticated packaging resulting in a lighter battery.

The present results show that the new $Li_{3-2x}M_xHalO$ glassy electrolyte or $Na_{3-2x}M_xHalO$ glassy electrolyte (in which M is a higher valent cation like $Ca^{2+}$ $Sr^{2+}$, $Mg^{+2}$ or $Ba^{2+}$, and Hal is a halide like $Cl^-$, or a mixture of halide ions like $F^-$, $Cl^-$, $Br^-$, $I^-$) has an extremely high ionic conductivity that is well above the lithium-ion conductivity of any other superionic conductor at T=25° C. (25 $mScm^{-1}$).

It is the first time that a glass formed from an antiperovskite crystal is presented.

In addition, this new electrolyte is chemically very stable with respect to Li-metal (more than 260 cycles), proving that it can be used in consumer electronic devices, and it is a light, good electronic insulator, non-flammable and contains no pollutants. Moreover, this novel electrolyte is easy to synthesize, thermally stable and electrochemical stable at least up to 8 V. It is thus promising for applications requiring batteries with high powers and energy densities, especially, for hybrid electric and pure electric vehicles.

The present invention is not, obviously, in any way restricted to the herein described embodiments and a person with average knowledge in the area can predict many possibilities of modification of the same invention and substitutions of technical characteristics by others equivalent, depending on the requirements of each situation, as defined in the appended claims.

The embodiments described above can be combined with each other. The following claims further define the preferred embodiments of the present invention.

Date: 26 Feb. 2015

The invention claimed is:

1. A solid electrolyte glass comprising compound of formula $R_{3-2x}M_xHalO$ wherein
R is selected from the group consisting of lithium and sodium;
M is selected from the group consisting of magnesium, calcium, strontium, barium, and mixtures thereof;
Hal is selected from the group consisting of fluorine, chlorine, bromine, iodine and mixtures thereof;
X is the number of moles of M and $0<x<0.01$;
and the solid electrolyte glass has a glass transition point and an ionic conductivity of at least 13 mScm$^{-1}$ at 25° C.

2. The electrolyte glass according to claim 1, wherein R is lithium.

3. The electrolyte glass according to claim 1, wherein R is sodium.

4. The electrolyte glass according to claim 1, comprising an ionic conductivity of 13-60 mScm$^{-1}$ at 25° C.

5. The electrolyte glass according to claim 1, comprising an ionic conductivity of at least 25 mScm$^{-1}$ at 25° C.

6. The electrolyte glass according to claim 1, comprising an ionic conductivity of at least 17 mScm$^{-1}$ at 25° C.

7. The electrolyte glass according to claim 1, comprising an ionic conductivity of 17-105 mScm$^{-1}$ at 25° C.

8. The electrolyte glass according to claim 1, comprising an ionic conductivity of at least 31 mScm$^{-1}$ at 25° C.

9. The electrolyte glass according to claim 1, wherein X is 0.002, 0.005, 0.007 or 0.01.

10. The electrolyte glass according to claim 1, wherein Hal is a mixture of chlorine and iodine.

11. The electrolyte glass according to claim 1, wherein Hal is Hal=0.5Cl+0.5I.

12. The electrolyte glass according to claim 1, wherein Hal is a mixture of fluorine and iodine.

13. The electrolyte glass according to claim 1, wherein R is lithium, M is barium, Hal is chlorine and x is 0.005.

14. The electrolyte glass according to claim 1, wherein R is lithium, M is barium, Hal is a mixture of chlorine and iodine, x is 0.005.

15. The electrolyte glass according to claim 1, wherein R is sodium, M is barium, Hal is chlorine and x is 0.005.

16. A method for synthetizing a glass electrolyte comprising a compound of formula $Li_{3-2x}M_xHalO$ wherein
M is selected from the group consisting of magnesium, calcium, strontium, and barium;
Hal is selected from the group consisting of fluorine, chlorine, bromine, iodine, and mixtures thereof;
X is the number of moles of M and $0<x<0.01$;
the method comprising the following steps:
mixing a stoichiometric quantity of LiHal, LiOH, and one of the following compounds: $Mg(OH)_2$, $Ca(OH)_2$, $Sr(OH)_2$ or $Ba(OH)_2$, and mixtures thereof;
adding to said mixture deionized water and mixing to form a solution in a closed container;
heating said solution to a temperature of less than 250° C. for 2-8 h to form a heated product;
evaporating water in the heated product to form a synthesized electrolyte.

17. The method according to claim 16, further comprising:
introducing the synthetized glass electrolyte between electrodes of an electrochemical device;
heating the glass electrolyte up to a temperature between 170° C. and 240° and cooling the glass electrolyte.

18. A method for synthetizing a glass electrolyte comprising a compound of formula $Na_{3-2x}M_xHalO$ wherein
M is selected from the group consisting of magnesium, calcium, strontium, barium, and mixtures thereof;
Hal is selected from the group consisting of fluorine, chlorine, bromine, iodine and mixtures thereof; and
X is the number of moles of M and $0<x<0.01$;
the method comprising the following steps:
mixing a stoichiometric quantity of NaHal, NaOH, and one of the following compounds: Mg(OH)2, Ca(OH)2, Sr(OH)2 or Ba(OH)2, and mixtures thereof;
adding to said mixture deionized water and mixing to form a solution in a closed container;
heating said solution to a temperature of 70-90° C. for 2-8 h, then heating the solution to a temperature of 190° C.-250° C. for 2-8 hours to form a heated product; and
evaporating water in the heated product to form a synthesized glass electrolyte.

19. The method of claim 18, further comprising:
introducing the synthesized glass electrolyte between electrodes of an electrochemical device;
heating the glass electrolyte up to a temperature between 190° C. and 230° C.; and
cooling the glass electrolyte.

* * * * *